United States Patent
Kim et al.

(10) Patent No.: US 9,935,942 B2
(45) Date of Patent: Apr. 3, 2018

(54) AUTHENTICATION PROCESSING METHOD AND ELECTRONIC DEVICE FOR SUPPORTING THE SAME

(71) Applicant: Samsung Electronics Co., Ltd., Gyeonggi-do (KR)

(72) Inventors: Tae Hyun Kim, Seoul (KR); Young Sik Kim, Gyeonggi-do (KR); Yu Seung Kim, Seoul (KR); Dong Ho Jang, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 120 days.

(21) Appl. No.: 15/010,027

(22) Filed: Jan. 29, 2016

(65) Prior Publication Data

US 2016/0241542 A1    Aug. 18, 2016

(30) Foreign Application Priority Data

Feb. 17, 2015    (KR) .................. 10-2015-0024527

(51) Int. Cl.
   *H04L 29/06*    (2006.01)
   *G06F 21/36*    (2013.01)
   *H04W 12/06*    (2009.01)

(52) U.S. Cl.
   CPC ............ *H04L 63/083* (2013.01); *G06F 21/36* (2013.01); *H04W 12/06* (2013.01)

(58) Field of Classification Search
   CPC .................................................... H04L 63/083
   See application file for complete search history.

(56) References Cited

U.S. PATENT DOCUMENTS

| | | | |
|---|---|---|---|
| 7,360,086 B1 * | 4/2008 | Tsuchiya ................ | H04L 12/44 370/389 |
| 8,028,896 B2 | 10/2011 | Carter et al. | |
| 8,181,858 B2 | 5/2012 | Carter et al. | |
| 8,312,154 B1 * | 11/2012 | Cabrera .................. | H04L 67/02 709/227 |
| 8,516,138 B2 * | 8/2013 | Kuritzky ............... | H04L 63/083 709/229 |
| 9,300,629 B1 * | 3/2016 | Jahr ........................ | H04L 63/02 |
| 2002/0118671 A1 * | 8/2002 | Staples ............... | H04L 12/6418 370/352 |
| 2007/0016684 A1 * | 1/2007 | Stieglitz ................ | H04L 63/102 709/229 |
| 2009/0052870 A1 * | 2/2009 | Marsh ................ | H04N 7/17318 386/292 |
| 2009/0152343 A1 | 6/2009 | Carter et al. | |

(Continued)

*Primary Examiner* — Ali Shayanfar
(74) *Attorney, Agent, or Firm* — Cha & Reiter, LLC

(57) ABSTRACT

An electronic device and authentication processing method for operating the electronic device is provided. The authentication processing method includes transmitting to an external server credential information input in the electronic device through a user interface, receiving an authentication request of the credential information, processing the authentication request based on the credential information stored in the electronic device, or determining whether to transmit the authentication request through the communication module based on the credential information stored in the external server.

14 Claims, 11 Drawing Sheets

(56) References Cited

U.S. PATENT DOCUMENTS

| | | | |
|---|---|---|---|
| 2011/0302318 A1* | 12/2011 | Birger | H04L 12/2838 709/231 |
| 2011/0313872 A1 | 12/2011 | Carter et al. | |
| 2012/0096490 A1* | 4/2012 | Barnes, Jr. | G06Q 10/02 725/34 |
| 2012/0150870 A1* | 6/2012 | Liao | G06F 17/3082 707/748 |
| 2013/0125226 A1 | 5/2013 | Shah et al. | |
| 2014/0281501 A1* | 9/2014 | Korkishko | H04L 63/123 713/156 |
| 2014/0281506 A1* | 9/2014 | Redberg | H04L 63/067 713/159 |
| 2015/0113617 A1* | 4/2015 | Chastain | G06F 21/31 726/6 |
| 2015/0212468 A1* | 7/2015 | Adachi | G03G 15/5091 399/80 |
| 2016/0241542 A1* | 8/2016 | Kim | H04L 63/083 |
| 2017/0094510 A1* | 3/2017 | Khosravi | G06F 21/32 |

* cited by examiner

AUTHENTICATION PROCESSING METHOD AND ELECTRONIC DEVICE FOR SUPPORTING THE SAME

CLAIM OF PRIORITY

This application claims the benefit of priority under 35 U.S.C. § 119(a) from a Korean patent application filed on Feb. 17, 2015 in the Korean Intellectual Property Office and assigned Serial number 10-2015-0024527, the entire disclosure of which is hereby incorporated by reference.

BACKGROUND

Field of the Disclosure

The present disclosure relates to processing authentication.

Description of the Related Art

In general, electronic devices provide and support various functions. For example, each electronic device typically displays contents or executes an application of a specific function to support a corresponding function. Meanwhile, information stored in the electronic devices may include one or more functions where sharing of the information to other users is acceptable and other functions in which a user does want the information shared with the other users. Therefore, a need exists to ensure that private information in an electronic device is not shared with other users when certain applications are executed.

SUMMARY

Aspects of the present disclosure address at least some of the above-mentioned problems and/or disadvantages and to provide at least some of the advantages described below. Accordingly, an aspect of the present disclosure provides an authentication processing method for performing authentication processing (or procedure) according to a situation of an electronic device while more easily performing the authentication processing associated with a function access of the electronic device and the electronic device for supporting the same.

In accordance with an aspect of the present disclosure, an electronic device is provided. The electronic device may include a communication module, a user interface, a non-transitory memory, and at least one processor configured to be electrically connected with the communication module, the user interface, and the memory. The memory stores instructions, when executed by the processor, for allowing the processor to transmit credential information of the electronic device to an external server through the communication module, to receive an authentication request of the credential information through the user interface, to verify change enable/disable information, stored in the non-transitory memory, on whether credential information stored in the external server is changed, to process the authentication request according to at least a part of the change enable/disable information and the credential information stored in the electronic device, or to determine whether to transmit the authentication request through the communication module according to the credential information stored in the external server.

In accordance with another aspect of the present disclosure, an authentication processing method is provided. The authentication processing method in an electronic device includes a communication module and a user interface, and the process may include transmitting credential information of the electronic device to an external server through the communication module, receiving an authentication request of the credential information through the user interface, verifying change enable/disable information stored in the electronic device to identify whether credential information stored in the external server is changed, processing the authentication request according to at least a part of the change enable/disable information and the credential information stored in the electronic device, or determining whether to transmit the authentication request through the communication module according to the credential information stored in the external server.

In accordance with another aspect of the present disclosure, a method for operating an electronic device is provided. The electronic device including a communication module and a user interface and the method may include transmitting credential information input in the electronic device to an external server through the communication module, receiving an authentication request of the credential information through the user interface, determining whether the electronic device communicates with the external server, processing the authentication request according to at least a part of the determined result and the credential information stored in the electronic device, or determining whether to transmit the authentication request through the communication module according to the credential information stored in the external server.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent to the artisan from the following description taken in conjunction with the accompanying drawings, in which.

Throughout the drawings, it should be noted that like reference numbers are used to depict the same or similar elements, features, and structures.

DETAILED DESCRIPTION

Figure 1:
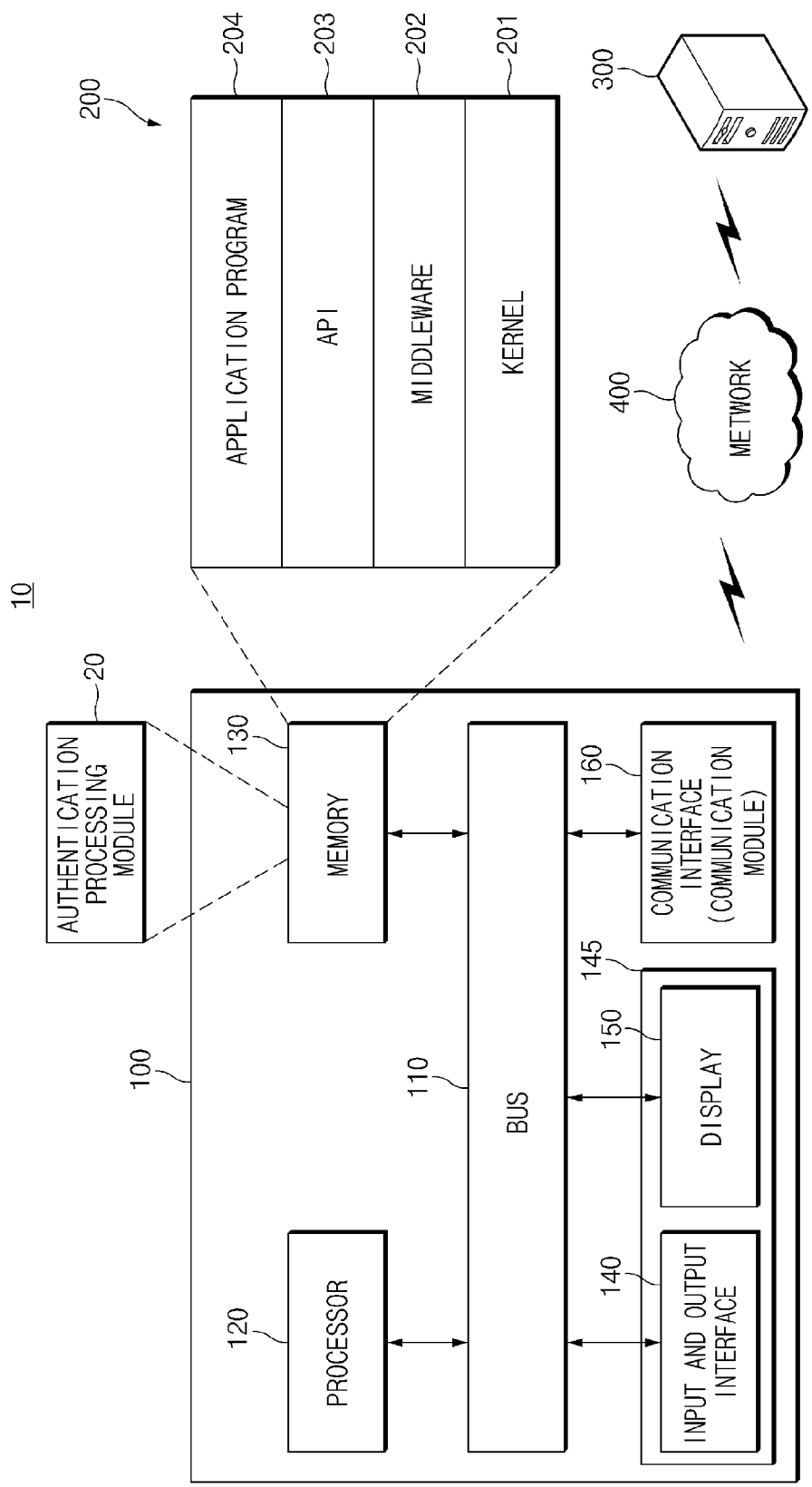
FIG. 1 is a block diagram illustrating a configuration of an authentication processing environment according to various embodiments of the present disclosure.

Hereinafter, the present disclosure is described with reference to the accompanying drawings. Various modifications are possible in various embodiments of the present disclosure and embodiments are illustrated in drawings and related detailed descriptions are listed. However, the present disclosure is not intended to be limited to the specific embodiments shown and described herein for illustrative purposes, and it is understood that it should include all modifications and/or, equivalents and substitutes within the scope and technical range of the present disclosure. With respect to the descriptions of the drawings, like reference numerals refer to like elements.

In the disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The expressions such as "1st", "2nd", "first", or "second", and the like used in various embodiments of the present disclosure may refer to various elements irrespective of the order and/or priority of the corresponding elements, but do not limit the corresponding elements. The expressions may be used to distinguish one element from another element. For instance, both "a first user device" and "a second user device" indicate different user devices from each other irrespective of the order and/or priority of the corresponding elements. For example, a first component may be referred to as a second component and vice versa without departing from the scope of the present disclosure.

It will be understood that when an element (e.g., a first element) is referred to as being "(operatively or communicatively) coupled with/to" or "connected to" another element (e.g., a second element), it can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

Depending on the situation, the expression "configured to" as used herein may be used as, for example, the expression "suitable for", "having the capacity to", "designed to", "adapted to", "made to", or "capable of". The term "configured to" is not defined as only "specifically designed to" hardware. Instead, the expression "a device configured to" may mean that the device is "capable of" operating together with another device or other components. For example, a "processor configured to perform A, B, and C" may mean a generic-purpose processor (e.g., a central processing unit (CPU) or an application processor) which may perform corresponding operations by executing one or more software programs which stores a dedicated processor (e.g., an embedded processor) for performing a corresponding operation.

Terms used in this specification are used to describe specified embodiments of the present disclosure and do not limit the scope of the appended claims. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal sense unless expressly so defined herein in various embodiments of the present disclosure. In some cases, even if terms are terms which are defined in the specification, they may not be interpreted to exclude embodiments of the present disclosure. Moreover, unless expressly specified otherwise, elements from one embodiment can be used in another embodiment (or embodiments) as not every exact combination of elements is described in the specification, so as not to obscure the present disclosure with a voluminous multitude of examples showing all the possible variations.

Electronic devices according to various embodiments of the present disclosure may include at least one of, for example, smart phones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices (e.g., smart glasses, head-mounted-devices (HMDs), an electronic apparel, electronic bracelets, electronic necklaces, electronic appcessories, electronic tattoos, smart mirrors, or smart watches).

According to various embodiments of the present disclosure, the electronic devices may be smart home appliances. The smart home appliances may include at least one of, for example, televisions (TVs), digital versatile disk (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ and PlayStation™), electronic dictionaries, electronic keys, camcorders, or electronic picture frames.

According to various embodiments of the present disclosure, the electronic devices may include at least one of various medical devices (e.g., various portable medical measurement devices (e.g., blood glucose meters, heart rate meters, blood pressure meters, or thermometers, and the like), a magnetic resonance angiography (MRA), a magnetic resonance imaging (MRI), a computed tomography (CT), scanners, or ultrasonic devices, and the like), navigation devices, global positioning system (GPS) receivers, event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to various embodiments of the present disclosure, the electronic devices may include at least one of parts of furniture or buildings/structures, electronic boards, electronic signature receiving devices, projectors, or various measuring instruments (e.g., water meters, electricity meters, gas meters, or wave meters, and the like). The electronic devices according to various embodiments of the present disclosure may be one or more combinations of the above-mentioned devices. The electronic devices according to various embodiments of the present disclosure may be flexible electronic devices. Also, electronic devices according to various embodiments of the present disclosure are not limited to the above-mentioned devices, and may include new electronic devices according to technology development.

Hereinafter, electronic devices according to various embodiments of the present disclosure will be described with reference to the accompanying drawings. The term "user" used herein may refer to a person who uses an electronic device or may refer to a device (e.g., an artificial electronic device) that uses an electronic device.

FIG. 1 is a block diagram illustrating a configuration of an authentication processing environment according to various embodiments of the present disclosure.

Referring now to FIG. 1, an authentication processing environment 10 may include an electronic device 100, a network 400, and a server device 300.

In the authentication processing environment 10, the electronic device 100 may perform at least one of local authentication processing performed according to first credential information (e.g., local authentication information) stored in its memory or remote authentication processing (or procedure) performed according to second credential information (e.g., remote authentication information) stored in the server device 300. According to an embodiment of the present disclosure, the electronic device 100 may adaptively perform at least one of the local authentication processing (or procedure) or the remote authentication processing in response to identifying/determining that a status of at least one of: (1) whether remote authentication information is changed, or (2) whether it is possible to use a network connected with the server device 300 is available.

The network 400 may provide support to establish a communication channel between the electronic device 100 and the server device 300. According to an embodiment of the present disclosure, the network 400 may include at least one of an Internet network, a wireless-fidelity (Wi-Fi) network, or a mobile communication network based on a base station. The network 400 may transmit a remote authentication request of the electronic device 100 to the server device 300. The network 400 may transmit a remote authentication result of the server device 300 to the electronic device 100. Also, the network 400 may transmit remote authentication information of the server device 300 to the electronic device 100 in response to a request of the electronic device 100 or a control of the server device 300.

The server device 300 may establish a communication channel with the electronic device 100 through the network 400. In connection with setting remote authentication, when the electronic device 100 is connected thereto, the server device 300 may provide a screen associated with setting remote authentication information. The server device 300 may store and manage input information, provided by the electronic device 100, as remote authentication information.

In connection with remote authentication processing, the server device 300 may receive a remote authentication request message from the electronic device 100. The server device 300 may extract input information from the received remote authentication request message. The server device 300 may compare the extracted input information with the stored remote authentication information. The server device 300 may transmit the compared result to the electronic device 100. For example, the server device 300 may provide a guide message or guide information indicating whether the remote authentication information is valid or invalid.

In connection with changing remote authentication information, the server device 300 may establish a communication channel with the electronic device 100 or another electronic device. If authentication (e.g., authentication through a specific identification (ID) and password, and the like) of the other electronic device is completed, the server device 300 may change remote authentication information associated with the electronic device 100 in response to a remote authentication information request of the other electronic device. In this regard, the server device 300 may provide a screen for changing the remote authentication information to the other electronic device. If receiving a message (or input information) for requesting the server device 300 to change remote authentication information from the other electronic device, the server device 300 may change the remote authentication information in response to the corresponding message.

In connection with synchronizing the changed remote authentication information, the server device 300 may provide an alarm or notification, for guiding that the remote authentication information is changed, to the electronic device 100 at a specific period or at a time when the remote authentication information is changed. Alternatively, if the electronic device 100 requests an access to the server device 300, the server device 300 may provide at least one of notification that the remote authentication information is changed or the changed remote authentication information to the electronic device 100. Alternatively, the server device 300 may provide the changed remote authentication information to the electronic device 100 in response to the request of the electronic device 100.

According to various embodiments of the present disclosure, in connection with authentication processing, the electronic device 100 may include a communication module, a user interface face 145 (e.g., at least one of an input and output interface 140 or a display 150 for supporting a touch function), a memory, and a processor electrically connected with the communication module, the user interface 145, and the memory. Herein, the communication module (e.g., a communication interface 160) may communicate a signal utilized for performing remote authentication processing according to credential information (e.g., remote authentication information) stored in the server device 300. The memory (e.g., a memory 130) may store credential information (e.g., local authentication information) utilized for processing authentication of the electronic device itself. The processor may process the above-mentioned function and may configure at least some of components of an authentication processing module 20 described below. The electronic device 100 may include the user interface 145 which supports a user input associated with authentication processing. For example, the electronic device 100 may include the user interface 145 (e.g., the input and output interface 140, the display 150 of a touch function, and the like).

According to an embodiment of the present disclosure, the above-mentioned electronic device 100 may include a bus 110, a processor 120, the non-transitory memory 130, the input and output interface 140, the display 150, and the communication interface 160 (or the communication module). Herein, at least one of the input and output interface 140 or the display 150 may be included in the user interface 145.

The bus 110 may be, for example, a circuit which may connect the components 120 to 160 with each other and may transmit communication (e.g., a control message and/or data) between the components. For example, the bus 110 may receive a specific function access request through the input and output interface 140. The bus 110 may transmit the received function access request (e.g., an input event) to the processor 120. The bus 110 may receive input information, associated with authentication processing, from the input and output interface 140. The bus 110 may transmit the received input information to the communication interface 160 or the processor 120 under control. As described above, the bus 110 may transmit various signals associated with local authentication processing or remote authentication processing.

The processor 120 may include one or more central processing units (CPU), an application processor (AP), and a communication processor (CP). The processor 120, which comprises hardware circuitry (such as integrated circuits) configured for operation, may execute, for example, calculation or data processing about control and/or communication of at least another component of the electronic device 100. According to an embodiment of the present disclosure, the processor 120 may actually comprises a plurality of processors (i.e. more than one) and may include at least one processor (or process, task, or thread) associated with local authentication processing. Also, the processor 120 may include at least one processor associated with remote authentication processing, at least one processor associated with synchronizing remote authentication information, and at least one processor associated with processing guide information according to authentication success or failure. The above-mentioned processor 120 may perform signal processing associated with operating an authentication processing module 20 described below. Alternatively at least a part of the processor 120 may operate as a hardware module of the authentication processing module 20.

The non-transitory memory 130 may include a volatile memory and/or a non-volatile memory. The non-transitory memory 130 may store instructions or data associated with at least another component of the electronic device 100. According to an embodiment of the present disclosure, the non-transitory memory 130 may store function information. The function information may include at least one of a function processing environment, an application, or the contents which are requested to process authentication. According to an embodiment of the present disclosure, the non-transitory memory 130 may store software and/or a program 200 for execution by hardware. The program 200 may include, for example, a kernel 201, a middleware 202, an application interface 203 (e.g., an application programming interface (API)), or an application 204 (or an application program). At least a part of the kernel 201, the middleware 202, or the application interface 203 may be referred to as an operating system (OS).

The kernel 201 may control or manage, for example, system resources (e.g., the bus 110, the processor 120, or the memory 130, and the like) used to execute an operation or function implemented in the other programs (e.g., the middleware 202, the application interface 203, or the application 204). Also, when the middleware 202, the application interface 203, or the application 204 accesses a separate component of the electronic device 100, the kernel 201 may provide an interface which may control or manage system resources.

The middleware 202 may play a role as, for example, a go-between such that the application interface 203 or the application 204 communicates with the kernel 201 and transmits and receives data. Also, the middleware 202 may perform control (e.g., scheduling or load balancing) with respect to work requests using a method of assigning priority as to who may use system resources (the bus 110, the processor 120, or the memory 130, and the like) of the electronic device 100 to, for example, at least one of the application 204, in connection with the work requests received from the application 204.

The middleware 202 may include information (e.g., at least one program, a program routine, a function, and data such as a template) associated with processing authentication. For example, the middleware 202 may include information associated with local authentication processing or information for requesting remote authentication processing.

The application interface 203 may be, for example, an interface in which the application 204 controls a function provided from the kernel 201 or the middleware 202. For example, the application interface 203 may include at least one of an interface or a function (e.g., instruction) for file control, window control, image processing, or text control, and the like.

The application 204 may be a program associated with at least one function provided to a user through an operation of the electronic device 100. According to an embodiment of the present disclosure, the application 204 may include a security application which is requested to input authentication information while under execution, and an application which is not requested to input authentication information while under execution. The application which is requested to input the authentication information from among the applications may include, for example a code for requesting authentication processing.

According to various embodiments of the present disclosure, a display object associated with the security application may be displayed so as to visually distinguish from other applications. For example, a display object associated with the application which is requested to input authentication information may be displayed with an icon or a menu item having a specific display effect (e.g., at least one of an added badge, a highlight, a specific color, a specific shape, or a specific shape). Other types of distinguishment are within the scope of the examples, for example, the display affect could flash, alternate display in different formats, distinguish the background, and even could include making the device vibrate or emit a sound, just to name some non-limiting possibilities.

According to various embodiments of the present disclosure, the non-transitory memory 130 may include at least one content (or data, for example, a photo, text, a video, a picture, a website, and the like). The at least one content may include, for example, a content which is requested to input authentication information when being accessed and a content which is not requested to input authentication information when being accessed. The input and output interface 140 may play a role as, for example, an interface which may transmit instructions or data input from the user or another external device to another component (or other components) of the electronic device 100. Also, the input and output interface 140 may output instructions or data received from another component (or other components) of the electronic device 100 to the user or the other external device. The input and output interface 140 may include, for example, at least one physical button or touch button, a touch pad, or a touch screen, and the like. Also, the input and output interface 140 may include an input device such as an electronic pen. Also, the input and output interface 140 may include an audio collection device which may collect an audio signal. The input and output interface 140 may include an input interface which may receive at least one of a number, a character, a special character, a picture of a specific pattern, a touch of a specific pattern, or sensor information of a specific pattern. For example, the input and output interface 140 may include a physical button, a touch pad, a virtual button, and the like for inputting a number, a character, a special character, or a picture of a specific pattern. The input and output interface 140 may include a touch screen for a touch input of a specific pattern. The input and output interface 140 may include at least one sensor (e.g., an acceleration sensor, a geomagnetic sensor, a tap sensor, an image sensor, a touch sensor, and the like) for inputting sensor information of a specific pattern.

The input and output interface 140 may include at least one output device which may output guide information associated with authentication processing. For example, the input and output interface 140 may include an audio output device, a lamp, a vibration output device, and the like. The input and output interface 140 may output at least one of a specific audio data, a specific ON/OFF pattern, or a specific vibration pattern corresponding to local authentication success or failure and remote authentication success or failure. The at least one of the audio data, the ON/OFF pattern, or the vibration pattern may be omitted according to settings or whether it is supported by the electronic device 100.

The display 150 may include, for example, a liquid crystal display (LCD), a light emitting diode (LED) display, an organic LED (OLED) display, or any other type of thin-film technology display. The display can include a microelectromechanical systems (MEMS) display, or an electronic paper display. The display 150 may display, for example, various contents (e.g., text, images, videos, icons, or symbols, and the like) to the user. The display 150 may include a touch screen, and may receive, for example, touch, gesture, proximity, or a hovering input using an electronic pen or a part of a body of the user.

The display 150 may output at least one screen associated with authentication processing. For example, the display 150 may output at least one object which may access a specific function. For example, the display 150 may output at least one of a pattern lock object, an icon object which is requested to process authentication, a menu item object which is requested to process authentication, a content object which is requested to process authentication, or a screen object which is requested to process authentication. The display 150 may output a display of an authentication information input region in response to an event (e.g., a home or power key input signal, an input signal associated with object selection, and a gesture input signal for a screen selection or a screen change, and the like) associated with object activation. The display 150 may output information (e.g., at least one of an image or text) about authentication success or failure for entered authentication input information. For example, the display 150 may output information about at least one of local authentication success, local authentication failure, remote authentication success, or remote authentication failure for authentication input information.

The communication interface 160 comprises hardware that is configured for operation and may establish, for example, a communication between the electronic device 100 and an external device. For example, the communication interface 160 may connect to a network 400 through wireless communication or wired communication and may communicate with the external device. The wireless communication may use at least one of, for example, long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), and the like, as a cellular communication protocol. The wired communication may include at least one of, for example, universal serial bus (USB) communication, high definition multimedia interface (HDMI) communication, recommended standard 232 (RS-232) communication, or plain old telephone service (POTS) communication. The network 400 may be a telecommunications network. The telecommunications network may include at least one of a computer network (e.g., a local area network (LAN) or a wide area network (WAN)), the Internet, or a telephone network.

The communication interface 160 may establish, for example, a communication channel with the server device 300, which supports remote authentication processing, through the network 400. According to various embodiments of the present disclosure, the communication interface 160 may establish a communication channel with the server device 300 in a direct scheme (e.g., a local-area communication scheme and the like) without passing through the network 400. The communication interface 160 may transmit a remote authentication processing request message to the server device 300. The communication interface 160 may receive a remote authentication processing result from the server device 300. The communication interface 160 may receive at least one of notification that remote authentication information has changed, or changed remote authentication information from the server device 300.

Figure 2:
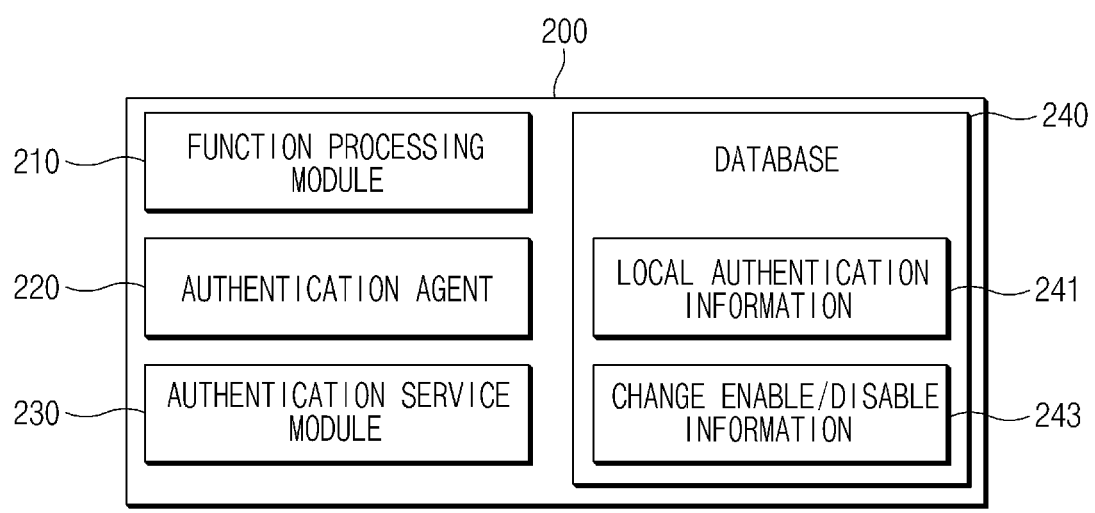
FIG. 2 is a block diagram illustrating a configuration of an authentication processing module according to various embodiments of the present disclosure.

FIG. 2 is a block diagram illustrating a configuration of an authentication processing module according to various embodiments of the present disclosure.

An authentication processing module 20 may be stored as a program in, for example, a memory 130 shown in FIG. 1 and loaded into processor 120 for execution. The authentication processing module 20 may be loaded into a processor 120 of FIG. 1 and may perform authentication processing in response to a control of the processor 120. Alternatively, the authentication processing module 20 may be configured with at least one processor. The authentication processing module 20 may provide input configuration or setting associated with entering a function (e.g., a function associated with at least one of a function processing environment, an application, or contents) which is executable in an electronic device 100 of FIG. 1. According to various embodiments of the present disclosure, when a function which is executable in the electronic device 100 is entered via a touchscreen or input device, if an authentication function is requested, the authentication processing module 20 may process the corresponding authentication and may process a function entry according to the processed result.

Referring now to FIG. 2, the authentication processing module 20 according to various embodiments of the present disclosure may include a function processing module 210, an authentication agent 220, an authentication service module 230, and a database 240.

The function processing module 210 may provide for display an icon, a menu item, a physical button, or a gesture (e.g., a touch gesture or a sensor gesture) associated with entering a function processing environment, executing an application, and executing contents. If an input signal associated with entering a function is generated, the function processing module 210 may be requested to process authentication from a program and a module associated with the corresponding function. According to various embodiments of the present disclosure, the function processing module 210 may be disposed external to the authentication processing module 20 and may request the authentication processing module 20 to transmit an authentication request to the function processing module. In case of a function which is not requested to process an authentication operation, the function processing module 210 may process a function entry (or a function execution or change). In case of a function which is requested to process an authentication operation, the function processing module 210 may transmit an authentication processing request to the authentication agent 220. If authentication processing is successively performed by the authentication agent 220, the function processing module 210 may control execution of a function which is requested to be entered. If an authentication failure message is received, the function processing module 210 may control an output of the received message. If an authentication failure message is received, the function processing module 210 may limit a corresponding function entry. If an authentication failure message is received for a predetermined number of times or greater, the function processing module 210 may limit a corresponding function entry.

If a request for processing authentication is received from the function processing module 210, the authentication agent 220 may control authentication processing. According to an embodiment of the present disclosure, if a request for processing authentication is received, the authentication agent 220 may control an input and output interface 140 of FIG. 1 associated with inputting authentication information. For example, the authentication agent 220 may control setting of a physical button for inputting authentication information, an output of a virtual keypad for inputting authentication information, and the like. According to various embodiments of the present disclosure, the authentication agent 220 may control activation of a specific device according to a type of authentication information. For example, the authentication agent 220 may control at least one of activation of a microphone (e.g., if authentication information includes audio information), activation of a camera (e.g., if authentication information includes fingerprint information, iris information, or face recognition information), or activation of at least one sensor (e.g., if authentication includes a touch gesture or an operation gesture) associated with inputting authentication information. In this operation, the authentication agent 220 may output guide information associated with inputting authentication information. For example, the authentication agent 220 may output an audio input request, a photographing request, and a request for performing a specific operation for authentication information using at least one of text, an image, or an audio.

If information associated with authentication is input, the authentication agent 220 may perform at least one of verification of change enable/disable information 243 indicating whether remote authentication information is changed or verification about whether a network is available. According to an embodiment of the present disclosure, the authentication agent 220 may perform at least one of remote authentication processing or local authentication processing according to a least one of the change enable/disable information 243, or determining whether the network is available. For example, if the network is available, the authentication agent 220 may perform the remote authentication processing. If it is impossible to perform the remote authentication processing, the authentication agent 220 may request the authentication service module 230 to perform the local authentication processing. If remote authentication fails when processing the remote authentication using the network, the authentication agent 220 may verify whether remote authentication information of the change enable/disable information 243 has changed. When the remote authentication information of the change enable/disable information 243 has changed, the authentication agent 220 may control an output of a related message.

According to an embodiment of the present disclosure, if the change enable/disable information 243 indicates that remote authentication information has not changed (i.e. remains the same from the last time it was checked), the authentication agent 220 may request the authentication service module 230 to perform the local authentication processing. The authentication agent 220 may control the remote authentication processing additionally or control an output of a user warning according to whether the network is available and whether local authentication succeeds. Herein, if the network is available and if local authentication succeeds, the authentication agent 220 may additionally verify whether the remote authentication information has changed while performing the remote authentication processing. If the remote authentication information has changed, the authentication agent 220 may update the change enable/disable information 243 (e.g., change the change enable/disable information 243 to indicate that the remote authentication information has changed).

The authentication service module 230 may receive a request for local authentication processing from the authentication agent 220. The authentication service module 230 may compare input information transmitted from the authentication agent 220 with local authentication information 241 stored in the database 240. If the local authentication information 241 is identical to the input information, the authentication service module 230 may transmit a local authentication success message to the authentication agent 220 and the function processing module 210. When authentication fails, the authentication service module 230 may transmit a local authentication failure message to the authentication agent 220 and the function processing module 210.

The database 240 may store data associated with authentication processing of the electronic device 100. According to an embodiment of the present disclosure, the database 240 may store the local authentication information 241 and the change enable/disable information 243. The local authentication information 241 may be specific information input according to settings of the user. In connection with setting the local authentication information 241, the electronic device 100 may provide a local authentication information input screen. Alternatively, the local authentication information 241 may be synchronized with a remote authentication information of a server device 300 of FIG. 1. If remote authentication succeeds with the server device 300 according to initial user authentication, the local authentication information 241 may be input authentication information. As described above, according to various embodiments of the present disclosure, the electronic device 100 may provide a support to use authentication information of the server device 300 in a local device (e.g., the electronic device 100). Therefore, after initial remote authentication succeeds, or initial authentication succeeds after remote authentication has changed, the local authentication information 241 may be synchronized with changed remote authentication information. In this operation, input information input in a remote authentication success process may be stored as local authentication information.

Alternatively, the electronic device 100 according to various embodiments of the present disclosure may request the server device 300 to set remote authentication information. If the setting of the remote authentication information is completed, the electronic device 100 may receive the set remote authentication information from the server device 300 and may store the received remote authentication information as the local authentication information 241.

With continued reference to FIG. 2, at least a part of the local authentication information 241 may include, for example, a number, a character, or a special character. At least a part of the local authentication information 241 may include audio data (e.g., speaking information about a specific letter entered by the user), image information (e.g., specific picture pattern information), face related information (e.g., a user face image or feature point information extracted from the user face image), and a human body related information (e.g., biometric information, such as fingerprint information, iris information, heartbeat related information, bloodstream related information, and the like). At least a part of the local authentication information 241 may include, for example, a touch gesture or an operation gesture.

The change enable/disable information 243 may be information indicating whether remote authentication information is changed. The change enable/disable information 243 may correspond to, for example, a Boolean function (e.g., one bit) indicating a change of remote authentication information. Alternatively, the change enable/disable information 243 may correspond to flag information (including a flag indicating a changed state and a flag indicating a non-changed state). The change enable/disable information 243 may be changed according to an authentication result of previously remote authentication processing (e.g., processing performed immediately before a currently remote authentication processing request).

As described above, according to various embodiments of the present disclosure, the electronic device may include a communication module, a user interface, a non-transitory memory, and a processor electrically connected via a bus to the communication module, the user interface, and the memory. The memory may store instructions, which when loaded into a processor for execution, causes the processor to transmit credential information of the electronic device to an external server through the communication module, to receive an authentication request of the credential information through the user interface, to verify change enable/disable information, stored in the memory, on whether the credential information stored in the external server is changed, to process the authentication request based on at least a part of the change enable/disable information and the credential information stored in the electronic device, or to determine whether to transmit the authentication request through the communication module based on the credential information stored in the external server.

According to various embodiments of the present disclosure, if change enable/disable information indicating whether the credential information is changed to indicate a non-change state of remote authentication information, the processor may process a local authentication request based on the credential information stored in the electronic device.

According to various embodiments of the present disclosure, if the local authentication fails, the processor may transmit a remote authentication request based on the credential information stored in the external server.

According to various embodiments of the present disclosure, if the remote authentication fails, the processor may control an output of a specific guide information.

According to various embodiments of the present disclosure, if the remote authentication succeeds, the processor may control a grant of a requested function access.

According to various embodiments of the present disclosure, if the local authentication succeeds, the processor may grant the requested function access and may transmit a remote authentication request based on the credential information stored in the external server.

According to various embodiments of the present disclosure, if the remote authentication fails, the processor may set a state value of change enable/disable information to a value indicating a changed state of remote authentication information.

According to various embodiments of the present disclosure, if the change enable/disable information indicates a changed state of remote authentication information and if a network is available, the processor may control performance of the remote authentication processing. If the changed enable/disable information indicates the changed state of the remote authentication information and if the network is unavailable, the processor may control performance of the local authentication processing.

According to various embodiments of the present disclosure, if the remote authentication succeeds, the processor may grant a function access and may set the change enable/disable information to a value indicating a non-changed state of remote authentication information.

According to various embodiments of the present disclosure, if the remote authentication fails, the processor may limit a function access and may control an output of guide information associated with an information change.

Also, as described above, according to various embodiments of the present disclosure, the electronic device may include an authentication processing module configured to control local authentication processing performed based on local authentication information stored in the electronic device or remote authentication processing performed based on remote authentication information stored in an external server device and a memory configured to store at least function accessed through at least one of the local authentication processing or the remote authentication processing and to store a program or module. The authentication processing module may control performance of at least one of the local authentication processing or the remote authentication processing for input information input based on at least one of a state of information indicating whether the remote authentication information has changed or whether a network is available.

Figure 3:
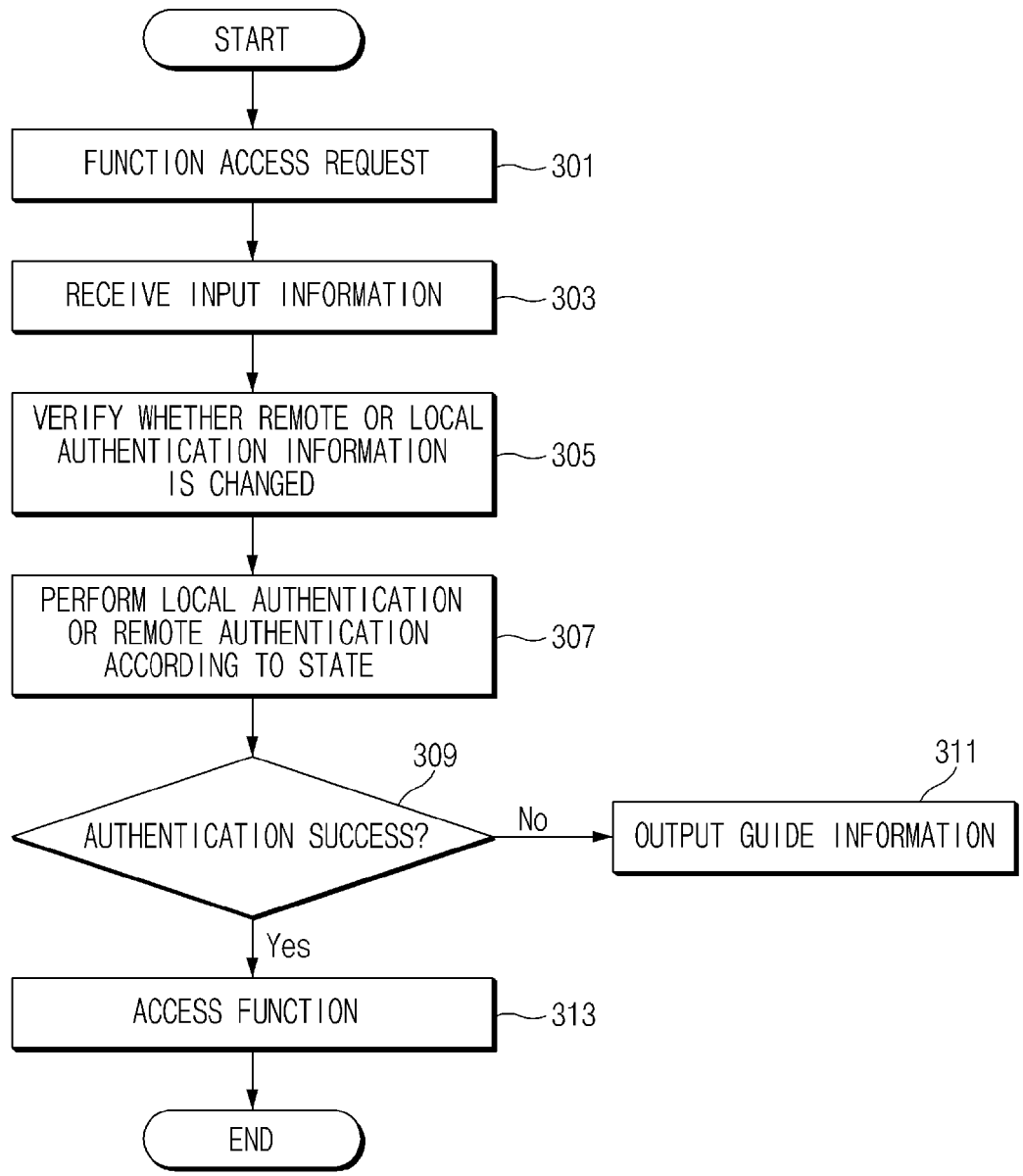
FIG. 3 is a flowchart illustrating an operational procedure of a method for operating an electronic device according to various embodiments of the present disclosure.

FIG. 3 is a flowchart illustrating a method for operating an electronic device according to various embodiments of the present disclosure.

Referring now to FIG. 3, the method for operating the electronic device according to various embodiments of the present disclosure, in operation 301, an electronic device 100 of FIG. 1 receives a function access request. The electronic device 100 may receive an icon selection, a menu selection, or a predetermined input signal which is associated with a function access.

In operation 303, the electronic device 100 receives input information. If a function requested to be accessed is a function utilized for verifying authentication information, the electronic device 100 may receive authentication information. For example, the electronic device 100 may output an information input window on a display 150 of FIG. 1. The electronic device 100 may receive input information through the information input window. According to various embodiments of the present disclosure, the electronic device 100 may receive input information from a microphone, a physical button, or a specific sensor.

In operation 305, the electronic device 100 may verify whether local authentication information or remote authentication information has changed. According to an embodiment of the present disclosure, the electronic device 100 may verify whether remote authentication information is changed. For example, the electronic device 100 may verify a state of change enable/disable information 243 of FIG. 2 indicating whether the remote authentication information has changed. If the remote authentication information has not changed, the electronic device 100 may verify whether a network is in an operable state. For example, the electronic device 100 may verify whether a current state is a state where a communication interface 160 of FIG. 1 is available. Alternatively, the electronic device 100 may verify whether the current state is a state where it is connected to a network 400 of FIG. 1. Alternatively, the electronic device 100 may verify whether the current state is a state where it is connected to a server device 300 of FIG. 1.

If a network for remote authentication is in an unavailable state, the electronic device 100 may determine whether to perform local authentication processing. If the network for remote authentication is in the unavailable state, the electronic device 100 may determine that the local authentication processing is performed. If remote authentication information has changed, the electronic device 100 may determine that the local authentication processing is performed.

In operation 307, the electronic device 100 may perform local authentication or remote authentication according to the determination of the state. For example, the electronic device 100 may compare the input information with local authentication information 241 of FIG. 2 in connection with the local authentication processing. The electronic device 100 may transmit the input information to the server device 300 in connection with remote authentication processing.

In operation 309, the electronic device 100 may verify whether authentication succeeds. If the authentication fails, in operation 311, the electronic device 100 may output guide information. For example, the electronic device 100 may output guide information associated with local authentication failure or guide information associated with remote authentication failure. Additionally or alternatively, the electronic device 100 may output guide information about a network unavailable state, guide information about a state change of the remote authentication information, and the like according to its situation. After outputting the guide information, the electronic device 100 may limit a function entry. If the corresponding function entry is attempted again, the electronic device 100 may control re-performance of the above-mentioned operations for a specific number of times. When the specific number of times elapses, the electronic device 100 may process an icon or menu associated with a function not to be shown during a specific time. After the specific time elapses, the electronic device 100 may output an object or a screen associated with the function which fails in being entered.

If the authentication succeeds, in operation 313, the electronic device 100 may process a function access. For example, the electronic device 100 may execute an application or may activate contents. Alternatively, the electronic device 100 may enter a security environment. Alternatively, the electronic device 100 may enter a specific user environment. Alternatively, the electronic device 100 may activate a specific webpage and may access a specific website.

Figure 4:
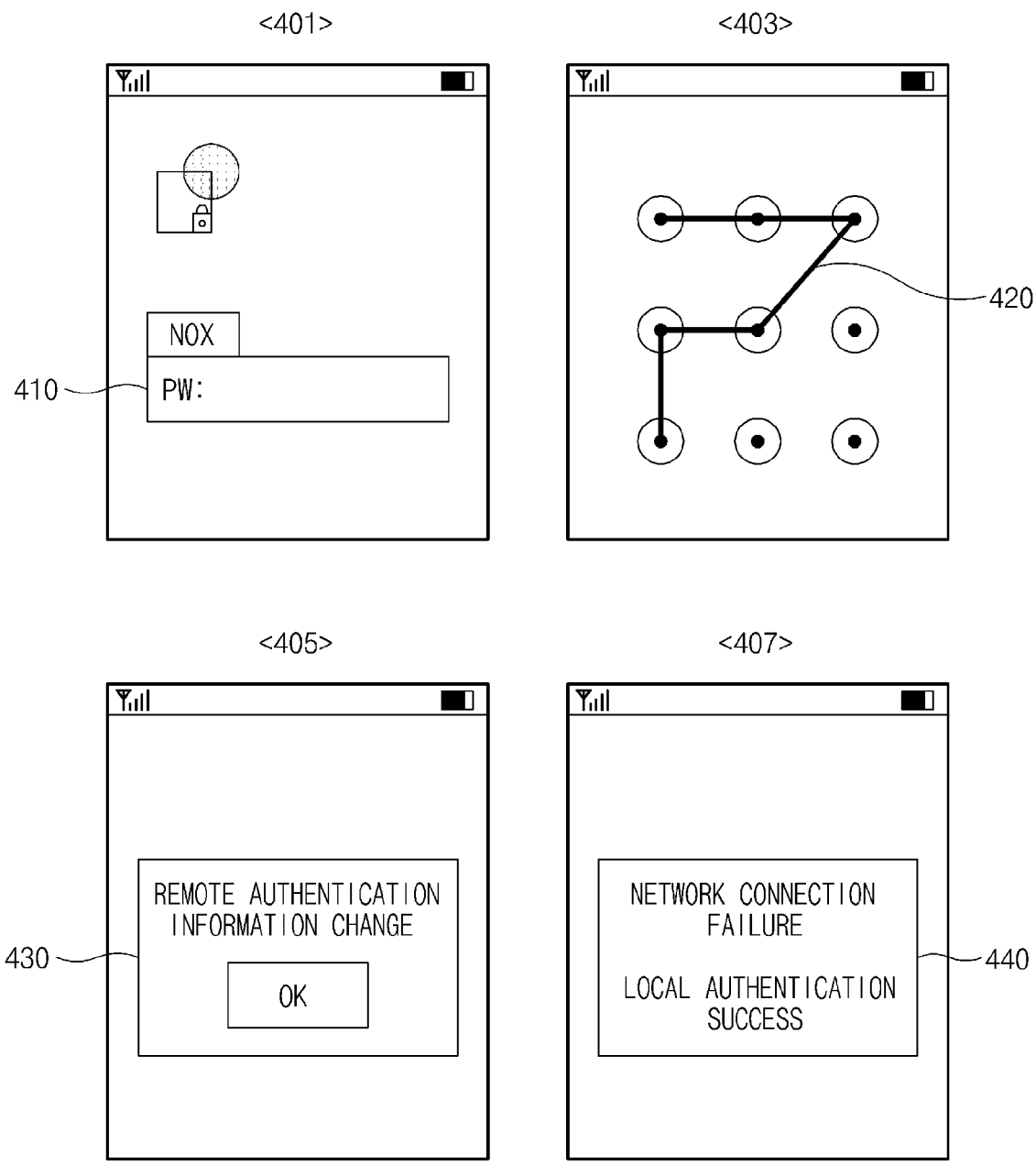
FIG. 4 is a drawing illustrating a screen interface associated with an electronic device according to various embodiments of the present disclosure.

FIG. 4 is a drawing illustrating a screen interface associated with an electronic device according to various embodiments of the present disclosure.

Referring now to FIG. 4, when a user selects specific contents, an electronic device 100 of FIG. 1 may request the user to enter authentication information with a corresponding contents entry. In this case, the electronic device 100 may output an information input region object 410 for entering authentication information on a screen 401. The electronic device 100 may further output a virtual keypad for inputting authentication information together with the information input region object 410.

According to various embodiments of the present disclosure, when one of input events for activating a home key, a power key, and a pattern lock occurs, the electronic device 100 may output a specific pattern lock on a screen 403. The user may perform a gesture operation on the pattern lock to input a specific gesture input signal 420. The specific gesture input signal 420 may be, for example, displayed or may not be displayed on a display 150 of FIG. 1 according to settings. The specific gesture input signal 420 may be used as authentication input information.

The electronic device 100 may perform authentication processing for input information entered through the information input region object 410 or input information corresponding to the specific gesture input signal 420. For example, the electronic device 100 may perform at least one of remote authentication processing or local authentication processing according to whether remote authentication information is changed or whether a network is available.

The electronic device 100 may output change guide information 430 for guiding a change of remote authentication information on a screen 405. According to an embodiment of the present disclosure, the electronic device 100 may transmit input information to a server device 300 of FIG. 1. If changed remote authentication information is different from received input signal (or if the input information is identical to remote authentication information before being changed), the server device 300 may transmit a message for guiding a change of remote authentication information together with an authentication failure message to the electronic device 100. If receiving the authentication failure message and the change guide message, as shown in FIG. 4, the electronic device 100 may output guide information for guiding the change of the remote authentication information (e.g., text or an image). According to various embodiments of the present disclosure, if transmitting incorrect input information to the server device 300, the electronic device 100 may receive a message for an input information error. In this case, the electronic device 100 may output guide information corresponding to the input information error. According to various embodiments of the present disclosure, in case of local authentication failure, the electronic device 100 may output guide information for guiding the local authentication failure.

According to various embodiments of the present disclosure, when authentication succeeds, the electronic device 100 may output success guide information 440, associated with an authentication success characteristic, on a screen 407. For example, if local authentication for input information is performed due to a network unavailable state, as shown in FIG. 4, the electronic device 100 may output the success guide information 440 which includes network connection failure and a result (e.g., success) of performing the local authentication according to the network connection failure. According to various embodiments of the present disclosure, if receiving a remote authentication success message from the server device 300 in a network available state, the electronic device 100 may output guide information about remote authentication success. According to various embodiments of the present disclosure, after the local authentication succeeds, the electronic device 100 may perform remote authentication processing through background processing and the like. If a result according to the additional remote authentication processing performed through the background processing succeeds, the electronic device 100 may maintain a function entry state. Since remote authentication fails, the electronic device 100 may know a change state of authentication information of the server device 300. According to various embodiments of the present disclosure, the electronic device 100 may receive a remote authentication information change message as the result according to the additional remote authentication processing. If receiving the remote authentication information change message, the electronic device 100 may adjust a state value of change enable/disable information 243 of FIG. 2. For example, the electronic device 100 may process the change enable/disable information 243 to have a change state value. The electronic device 100 may synchronize remote authentication information of the server device 300 with local authentication information 241 of FIG. 2. In this operation, the electronic device 100 may maintain function performance according to local authentication which is being currently performed. Alternatively, the electronic device 100 may stop function performance according to the local authentication which is being currently performed and may output guide information for guiding the user to enter changed authentication information again. Also, the electronic device 100 may output at least one of guide information about a change of remote authentication information or guide information about synchronization of remote authentication information and the local authentication information 241.

Figure 5:
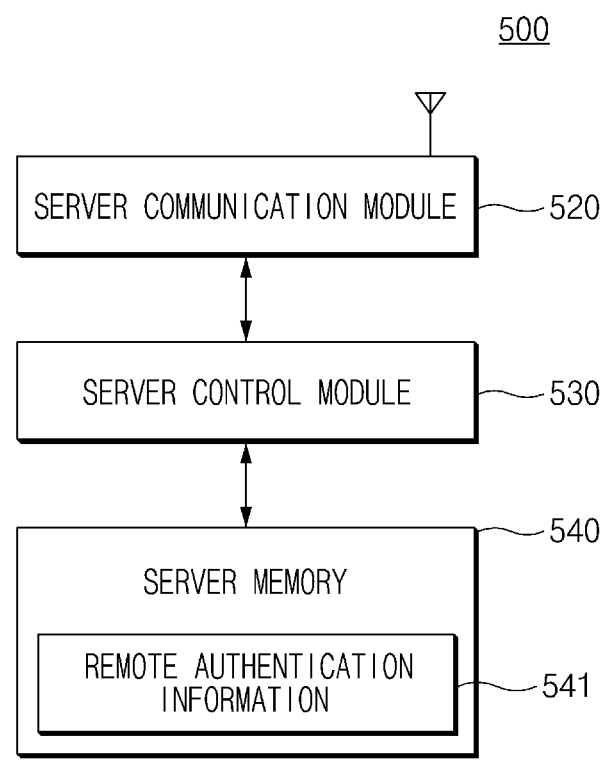
FIG. 5 is a block diagram illustrating a configuration of a server device according to various embodiments of the present disclosure.

FIG. 5 is a block diagram illustrating a configuration of a server device according to various embodiments of the present disclosure.

Referring now to FIG. 5, a server device 500 may include a server communication module 520, a server memory 530, and a server control module 540.

The server communication module 520 may be a communication module which may establish a communication channel with an electronic device 100 of FIG. 1. According to an embodiment of the present disclosure, the server communication module 520 may configure a communication channel with a communication interface 160 of the electronic device 100 through a network 400 of FIG. 1. The server communication module 520 may receive input information from the electronic device 100. The server communication module 520 may transmit a result of comparing the input information with remote authentication information 541 (e.g., an authentication success message or an authentication failure message, a remote authentication information change message, and the like) to the electronic device 100.

The server memory 540 may store programs and data utilized for operating the server device 500. For example, the server memory 540 may include an operating system (OS) utilized for operating the server device 500 and a remote authentication processing program for performing remote authentication processing. Also, the server memory 540 may store the remote authentication information 541. The remote authentication information 541 may be information stored according to user settings. The remote authentication information 541 may be information used to perform remote authentication of at least one electronic device. According to an embodiment of the present disclosure, at least a part of the remote authentication information 541 may include at least one of input information (e.g., at least one of a number, a character, or a special character) entered through an input key or a virtual input key, an image of a specific pattern (e.g., a drawing pattern or a pattern unlock image), specific audio data (e.g., user speaking information), specific face information (e.g., a face image or face feature point information), specific biometric information (e.g., fingerprint information, iris information, and the like), or specific gesture information (e.g., a touch gesture or an operation gesture). The above-mentioned remote authentication information 541 may be synchronized with, for example, local authentication information 241 of FIG. 2. According to various embodiments of the present disclosure, the remote authentication information 541 may be changed in response to a user request.

The server control module 530 may perform signal processing, signal transmission, or control signal generation, and the like which are associated with operating the server device 500. According to an embodiment of the present disclosure, when a specific electronic device is connected thereto, the server control module 530 may provide a virtual page associated with remote authentication processing. The server control module 530 may map identification information or connection information of the specific electronic device with the remote authentication information 541 set by the user. In this operation, the server control module 530 may verify an owner of the specific electronic device. For example, when the electronic device requests the server device 500 to set the remote authentication information 541, the server control module 530 may provide authentication information to the corresponding electronic device 100. If the authentication information provided to the electronic device 100 is correctly entered, the server control module 530 may complete the setting of the remote authentication information 541 of the electronic device 100.

If the remote authentication information 541 is set, the server control module 530 may receive a remote authentication processing request message from the electronic device 100. The server control module 530 may extract input information from the received remote authentication processing request message and may compare the extracted input information with the remote authentication information 541. The server control module 530 may control the server communication module 520 to transmit the compared result to the electronic device 100. For example, if the input information is identical to the remote authentication information 541, the server control module 530 may transmit an authentication success message to the electronic device 100. If the input information is different from the remote authentication information 541, the server control module 530 may transmit an authentication failure message to the electronic device 100. If the input information is identical to previous remote authentication information (e.g., remote authentication information set before being changed), the server control module 530 may transmit an authentication failure message and a remote authentication information change message to the electronic device 100.

Figure 6:
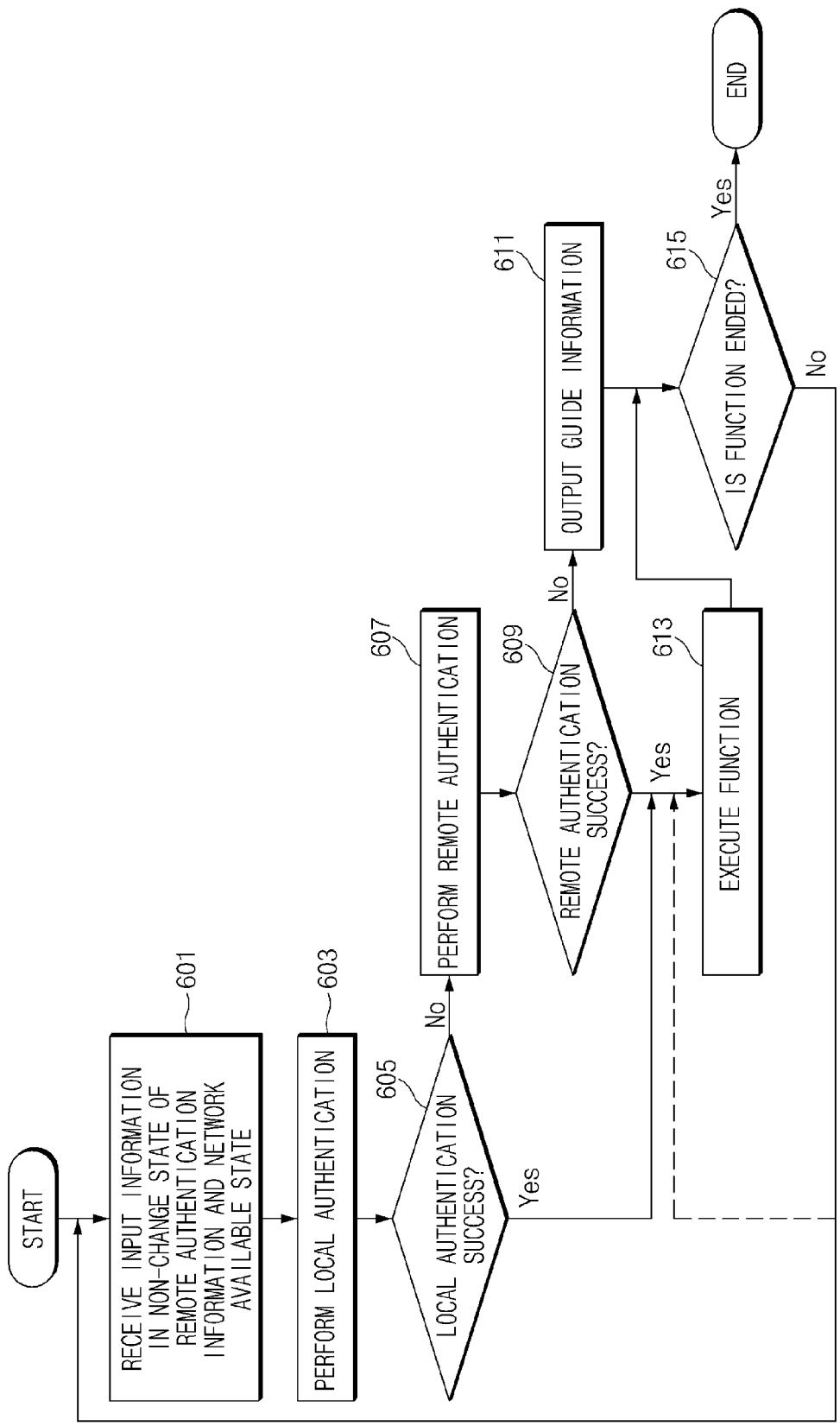
FIG. 6 is a flowchart illustrating an operational procedure of an authentication processing method according to various embodiments of the present disclosure.

After the authentication process is completed, the server control module 530 may provide an interface for changing the remote authentication information 541. For example, if a specific electronic device is connected thereto and if a change of remote authentication information is requested, the server control module 530 may provide a related virtual page to the specific electronic device. The specific electronic device may be the electronic device 100 or another electronic device which performs remote authentication processing through the remote authentication information 541. After performing an authentication process for changing the remote authentication information 541, the server control module 530 may update the remote authentication information 541 according to a user request. After changing the remote authentication information 541, the server control module 530 may process a message corresponding to an information change at a predetermine time when the electronic device 100 is connected thereto or when the electronic device 100 requests remote authentication processing. According to various embodiments of the present disclosure, a plurality of electronic devices may perform remote authentication processing through the one remote authentication information 541. FIG. 6 is a flowchart illustrating an operational example of an authentication processing method according to various embodiments of the present disclosure.

Referring now to FIG. 6, in the authentication processing method, in operation 601, an electronic device 100 of FIG. 1 may verify whether change enable/disable information 243 of FIG. 2 indicates a non-change state of remote authentication information. The electronic device 100 may receive input information in the non-change state and a network available state. For example, when a function entry utilized for verifying authentication information is requested, the electronic device 100 may perform a state change (e.g., an object output) for inputting information. Verification whether the remote authentication information is changed may be performed through the change enable/disable information 243. Verification of the network available state may be performed through whether a communication interface 160 of FIG. 1 is operated, whether the electronic device 100 may access a network 400 of FIG. 1, whether the electronic device 100 may access a server device 300 of FIG. 1, and the like.

If the remote authentication information is in the non-change state, in operation 603, the electronic device 100 may perform local authentication. Accordingly, the electronic device 100 may reduce an unnecessary usage of the network 400. In operation 605, the electronic device 100 may verify whether the local authentication succeeds.

If the local authentication fails, for example, if the input information is different from local authentication information 241 of FIG. 2, in operation 607, the electronic device 100 may perform remote authentication. For this purpose, the electronic device 100 may activate the communication interface 160 and may transmit the input information to the server device 300. Also, the electronic device 100 may transmit the input information and additional information (e.g., a user ID) that is utilized for authentication of the server device 300. In operation 609, the electronic device 100 may verify whether the remote authentication succeeds.

If the remote authentication fails, for example, if receiving a remote authentication failure message from the server device 300, in operation 611, the electronic device 100 may output guide information. For example, the electronic device 100 may output guide information for guiding local authentication failure or remote authentication failure.

If the remote authentication succeeds, for example, if receiving a remote authentication success message from the server device 300, in operation 613, the electronic device 100 may execute a function requested to be accessed. When the local authentication succeeds in operation 605, the electronic device 100 may branch to operation 613 and may execute the function requested to be accessed.

In operation 615, the electronic device 100 may verify whether an event associated with ending the function occurs. If the event associated with ending the function occurs, the electronic device 100 may end the function. The electronic device 100 may transit a current state to a state (e.g., a waiting screen, a home screen, and the like), performed immediately before a function entry is requested, according to the ending of the function. If the event associated with ending the function does not occur and if a previous state in a state where the guide information is output in operation 611, the electronic device 100 may branch to operation 601 and may repeat the processing from operation 601. If a previous state is a state where the function is executed in operation 613, the electronic device 100 may control the function which is being executed to be maintained.

Figure 7:
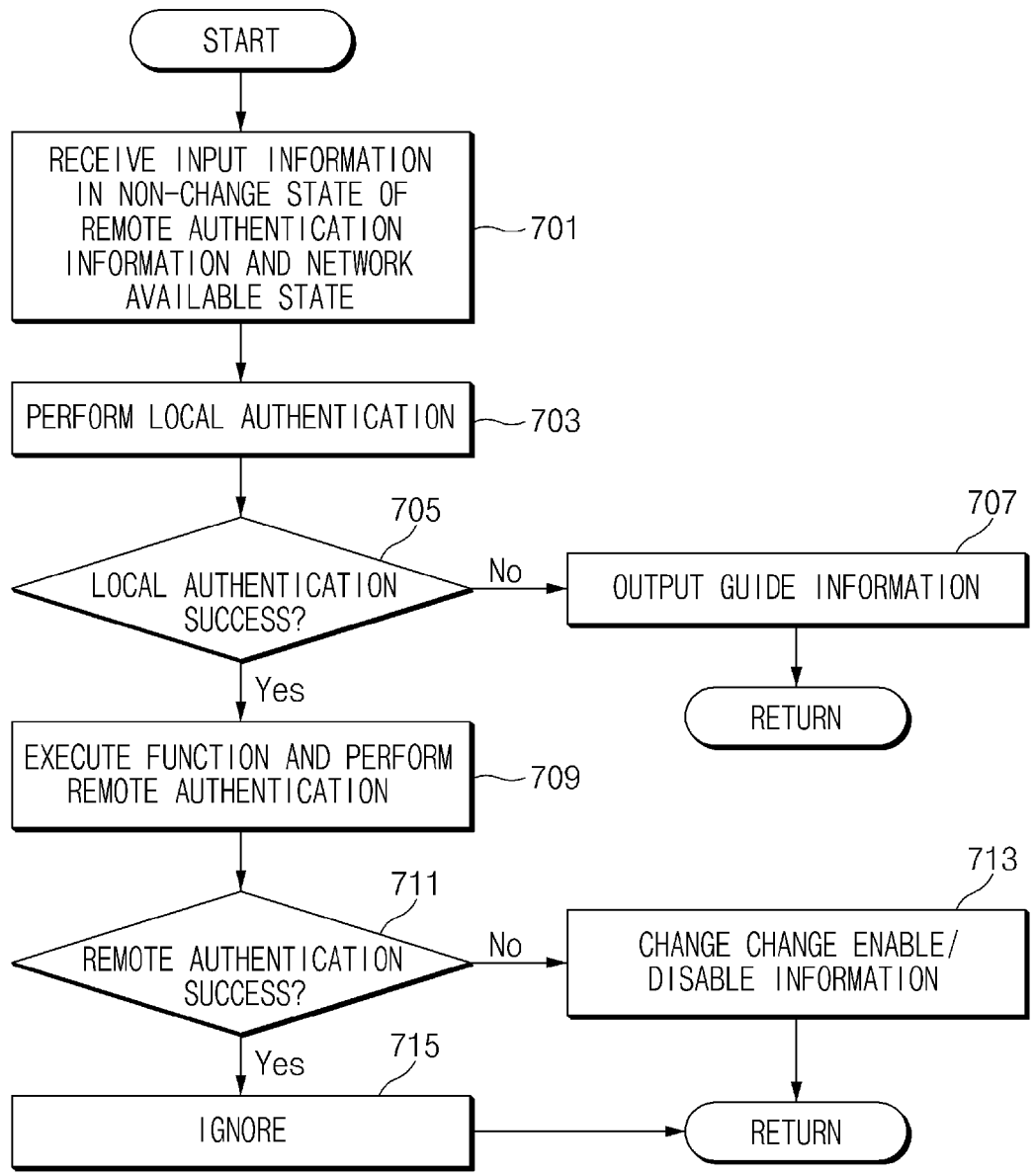
FIG. 7 is a flowchart illustrating an operational procedure of an authentication processing method according to various embodiments of the present disclosure.

FIG. 7 is a flowchart illustrating an operational example of an authentication processing method according to various embodiments of the present disclosure.

Referring now to FIG. 7, in the authentication processing method, in operation 701, an electronic device 100 of FIG. 1 may receive input information in a state where remote authentication information has not changed and is in a network available state. In this regard, the electronic device 100 may verify change enable/disable information 243 of FIG. 2 and a communication interface 160 of FIG. 1. Also, the electronic device 100 may support input setting associated with inputting information.

In operation 703, the electronic device 100 may perform local authentication. In operation 705, the electronic device 100 may verify whether the local authentication succeeds. The electronic device 100 may compare whether the input information is identical to local authentication information 241 of FIG. 2 or whether the input information is similar to the local authentication information 241 by specific magnitude or more. If the local authentication fails, in operation 707, the electronic device 100 may output guide information. For example, the electronic device 100 may guide that it is impossible to enter a corresponding function according to local authentication failure. Thereafter, the electronic device 100 may return a current state to a state before a function entry is requested.

If the local authentication succeeds, in operation 709, the electronic device 100 may execute a function and may perform remote authentication. In connection with performing the remote authentication, the electronic device 100 may activate the communication interface 160 through background processing and may transmit the input information to a server device 300 of FIG. 1. In this operation, the electronic device may transmit the input information and additional information (e.g., a user ID) utilized for authentication to the server device 300.

In operation 711, the electronic device 100 may verify whether the remote authentication succeeds. If the remote authentication fails, for example, if receiving a remote authentication information change message from the sever device 300 as the input information is different from remote authentication information 331 of FIG. 5, in operation 713, the electronic device 100 may change the change enable/disable information 243. In this operation, the processing of the remote authentication and the change enable/disable information 243 may be performed through background processing. If the remote authentication succeeds, in operation 715, the electronic device 100 may ignore the remote authentication result and may maintain the current function without performing a separate follow-up operation.

Additionally or alternatively, according to various embodiments of the present disclosure, the electronic device 100 may transmit the input information to the server device 300,500. If receiving a local authentication success message and the input information from the electronic device 100, the server device 300 may verify whether the remote authentication information 541 is updated. If the remote authentication information 541 is not updated, the server device 500 may transmit a message, for guiding a state where the remote authentication information 541 is not updated, to the electronic device 100. If the remote authentication information 541 is updated, the server device 500 may transmit a message, for guiding a state where the remote authentication information 541 is updated, to the electronic device 100. The electronic device 100 may transit a state value of the change enable/disable information 243 in response to the received update guide message. If the user who verifies a message indicating that the remote authentication information 541 is updated inputs specific information and if remote authentication succeeds, the electronic device 100 may update the input information, input when the remote authentication succeeds, as new local authentication information. Alternatively, according to various embodiments of the present disclosure, the electronic device 100 may receive changed remote authentication information from the server device 500 after authentication is performed and may update local authentication information.

Figure 8A:
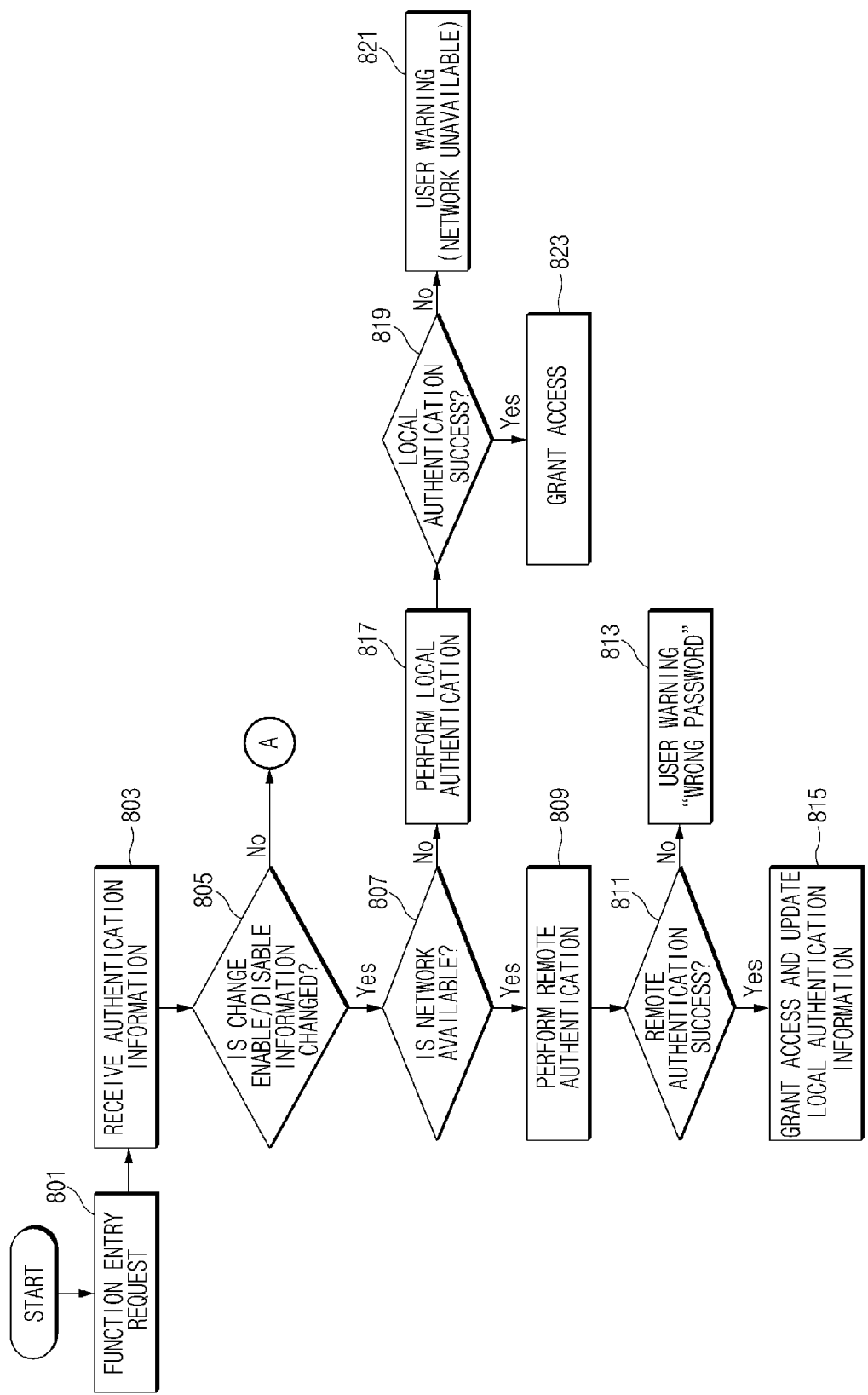
FIG. 8A is a flowchart illustrating an operational procedure of a part of an adaptive authentication processing method according to various embodiments of the present disclosure.

FIG. 8A is a flowchart illustrating a part of an adaptive authentication processing method according to various embodiments of the present disclosure.

Referring now to FIG. 8A, in the adaptive authentication processing method, in operation 801, an electronic device 100 of FIG. 1 may receive a function entry request. In this regard, the electronic device 100 may output an object, such as an icon or a menu item, a screen, and the like associated with at least one function entry. Alternatively, the electronic device 100 may receive a home or power key input signal as a function entry request in a sleep state.

In operation 803, the electronic device 100 receives authentication information. In this regard, if the function entry request is received, the electronic device 100 may have a state for inputting authentication information. For example, the electronic device 100 may activate a physical button, a virtual keypad, or an image board, or a touch screen for inputting a number, a character, or a picture, and the like. Alternatively, the electronic device 100 may activate at least one sensor (e.g., the touch screen, a biometric information sensor, such as a touch sensor and a fingerprint sensor, or an acceleration sensor, and the like) for supporting a specific gesture input or a sensor information input.

In operation 805, the electronic device 100 may verify whether change enable/disable information 243 of FIG. 2 is in a changed state. If the change enable/disable information 243 is in the changed state, in operation 807, the electronic device 100 may verify whether a network is in an available state. In this operation, the verification of the change enable/disable information 243 in operation 805 may be omitted because being associated with a message output according to remote authentication failure. If the network is in the available state, in operation 809, the electronic device 100 may perform remote authentication. In this regard, the electronic device 100 may transmit the input information to a server device 300 of FIG. 1. In operation 811, the electronic device 100 may verify whether the remote authentication succeeds. If the remote authentication fails, in operation 813, the electronic device 100 may output a user warning, for example, a wrong password. For example, the electronic device 100 may guide that incorrect information is input, relative to a changed state of remote authentication information.

According to various embodiments of the present disclosure, the server device 300,500 may store and manage previous remote authentication information and may verify whether the received input information is identical to the previous remote authentication information. If the input information is different from current remote authentication information and is identical to the previous remote authentication information, the server device 300,500 may transmit a message for guiding a change of remote authentication information to the electronic device 100. In this case, in operation 813, the electronic device 100 may output a message for guiding a change of remote authentication information. If the remote authentication succeeds, in operation 815, the electronic device 100 may grant a function access and may set the change enable/disable information 243 to a specific value (e.g. false (F) indicating remote authentication information 541 of the server device 300,500 is not changed).

In operation 807, if the network in an unavailable state, in operation 817, the electronic device 100 may perform local authentication. In operation 819, the electronic device 100 may verify whether the local authentication succeeds. If the local authentication fails, in operation 821, the electronic device 100 may output a user warning, for example, a network unavailable message. If the local authentication succeeds, in operation 823, the electronic device 100 may grant a function access. Additionally or alternatively, in operation 821, the electronic device 100 may output guide information about authentication information changed according to local authentication failure in a state where the change enable/disable information 243 is changed. For example, the electronic device 100 may output information for guiding that local authentication information is changed according to the change of the remote authentication information. As described above, it is impossible to perform remote authentication, the electronic device 100 may automatically transit the remote authentication to local authentication.

Figure 8B:
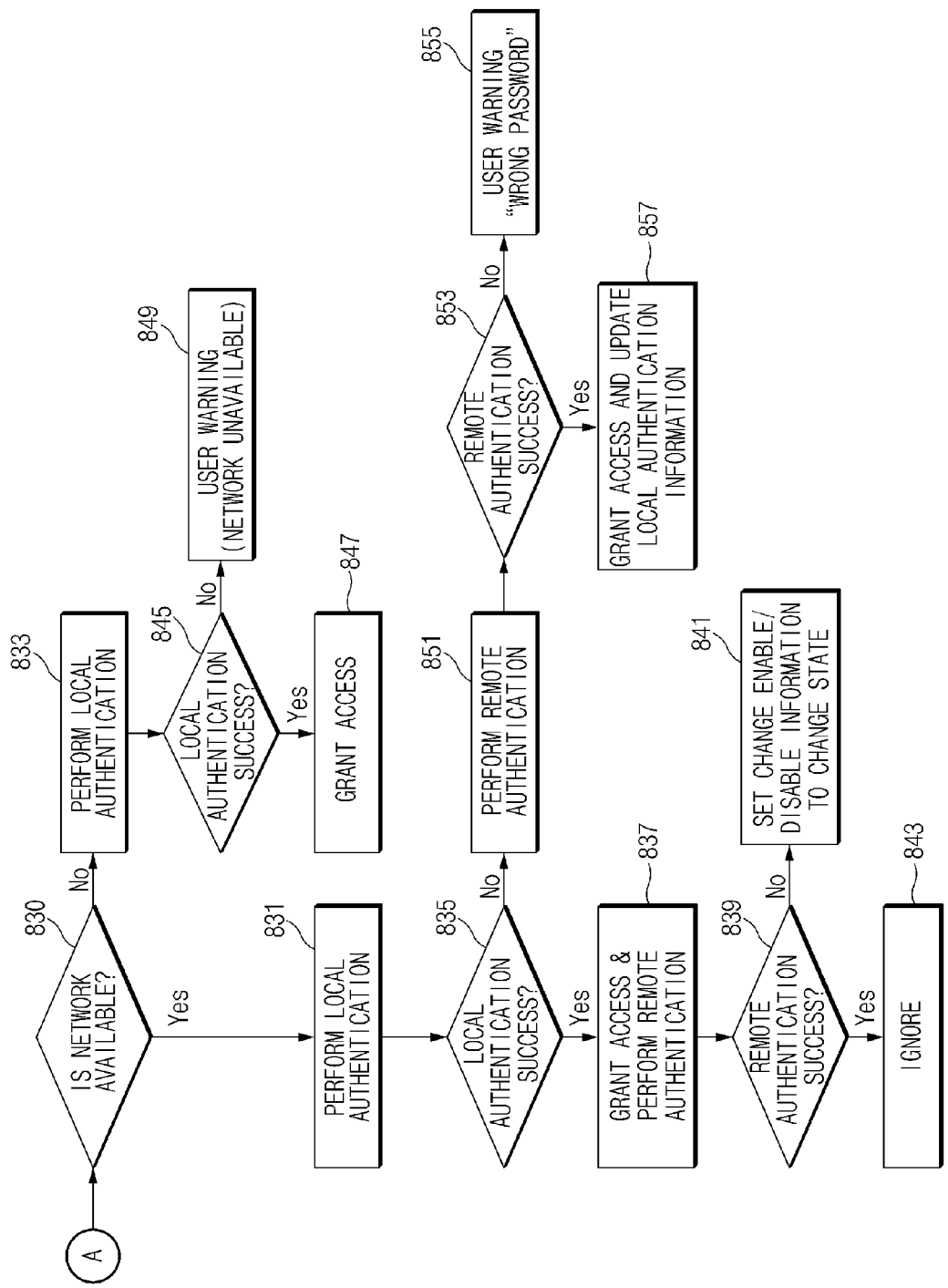
FIG. 8B is a flowchart illustrating an operational procedure the other part of an adaptive authentication processing method shown in FIG. 8A according to various embodiments of the present disclosure.

FIG. 8B is a flowchart illustrating the other part of an adaptive authentication processing method according to various embodiments of the present disclosure.

Referring now to FIG. 8B, in the adaptive authentication processing method, in operation 830, an electronic device 100 of FIG. 1 may verify whether a network is in an available state. If the network is in the available state, in operation 831, the electronic device 100 may perform local authentication. In operation 835, the electronic device 100 may verify whether the local authentication succeeds.

If the local authentication succeeds, in operation 837, the electronic device 100 may grant a function access and may perform remote authentication. The remote authentication may be processed through, for example, a background processing scheme. In operation 839, the electronic device 100 may verify whether the remote authentication succeeds. If the remote authentication fails, the electronic device 100 may set change enable/disable information 243 of FIG. 2 to a change state. Therefore, if a new function entry is requested, after processing the change enable/disable information 243 as a changed state in operation 805 of FIG. 8A, the electronic device 100 may perform a processing operation according to the changed state of the change enable/disable information 243. The electronic device 100 may receive changed remote authentication information from a server device 300 of FIG. 1 and may update the received remote authentication information as local authentication information.

If the remote authentication succeeds, the electronic device 100 may ignore authentication success. If the local authentication fails in operation 835, in operation 851, the electronic device 100 may perform remote authentication. In operation 853, the electronic device 100 may verify whether the remote authentication succeeds.

If the remote authentication fails, the electronic device 100 may output an information change as a user warning. For example, the electronic device 100 may guide information about the fact that remote authentication information has changed. In this operation, the electronic device 100 may output change time information, changed electronic device identification information, and the like, associated with a change of the remote authentication information, together. If the remote authentication succeeds, in operation 857, the electronic device 100 may grant a function access.

If the network is in an unavailable state in operation 830, in operation 833, the electronic device 100 may perform local authentication. In operation 845, the electronic device 100 may verify whether the local authentication succeeds. If the local authentication fails, in operation 847, the electronic device 100 may output a message, for a network unavailable state, as a user warning. If the local authentication succeeds, in operation 849, the electronic device 100 may grant a function access.

As described above, according to various embodiments of the present disclosure, the method for operating the electronic device including a communication module and a user interface may include transmitting credential information of the electronic device to an external server through the communication module, receiving an authentication request of the credential information through the user interface, verifying change enable/disable information, stored in the electronic device, on whether credential information stored in the external server is changed, processing the authentication request based on at least a part of the change enable/disable information and the credential information stored in the electronic device, or determining whether to transmit the authentication request through the communication module based on the credential information stored in the external server.

According to various embodiments of the present disclosure, the processing of the authentication request may include requesting local authentication based on the credential information stored in the electronic device, if the change enable/disable information indicating whether the credential information is changed indicates a non-change state of remote authentication information.

According to various embodiments of the present disclosure, the determining whether to transmit the authentication request may include requesting remote authentication based on the credential information stored in the external server, if the local authentication fails.

According to various embodiments of the present disclosure, the method may further include controlling an output of specific guide information, if the remote authentication fails.

According to various embodiments of the present disclosure, the method may further include controlling a grant of a requested function access, if the remote authentication succeeds.

According to various embodiments of the present disclosure, the method may further include granting the requested function access and requesting remote authentication based on the credential information stored in the external server, if the local authentication succeeds.

According to various embodiments of the present disclosure, the method may further include setting a state value of the change enable/disable information to a value indicating a change state of remote authentication information, if the remote authentication fails.

According to various embodiments of the present disclosure, the method may further include controlling performance of remote authentication processing, if the change enable/disable information indicates a change state of remote authentication information and if a network is an available and controlling performance of local authentication processing, if the change enable/disable information indicates the change state of the remote authentication information and if a network is an unavailable.

According to various embodiments of the present disclosure, the method may further include granting a function access and setting the change enable/disable information to a value indicating a non-change state of remote authentication information, if the remote authentication succeeds.

According to various embodiments of the present disclosure, the method may further include limiting a function access and controlling an output of guide information associated with an information change, if the remote authentication fails.

Also, as described above, according to various embodiments of the present disclosure, the authentication processing method may include receiving a function access request utilized for authentication processing, receiving input information associated with the authentication processing, and performing at least one of local authentication processing performed based on local authentication information stored in an electronic device or remote authentication processing performed based on remote authentication information stored in an external server device, based on at least one of whether the remote authentication information is changed or whether a network is available.

Figure 9:
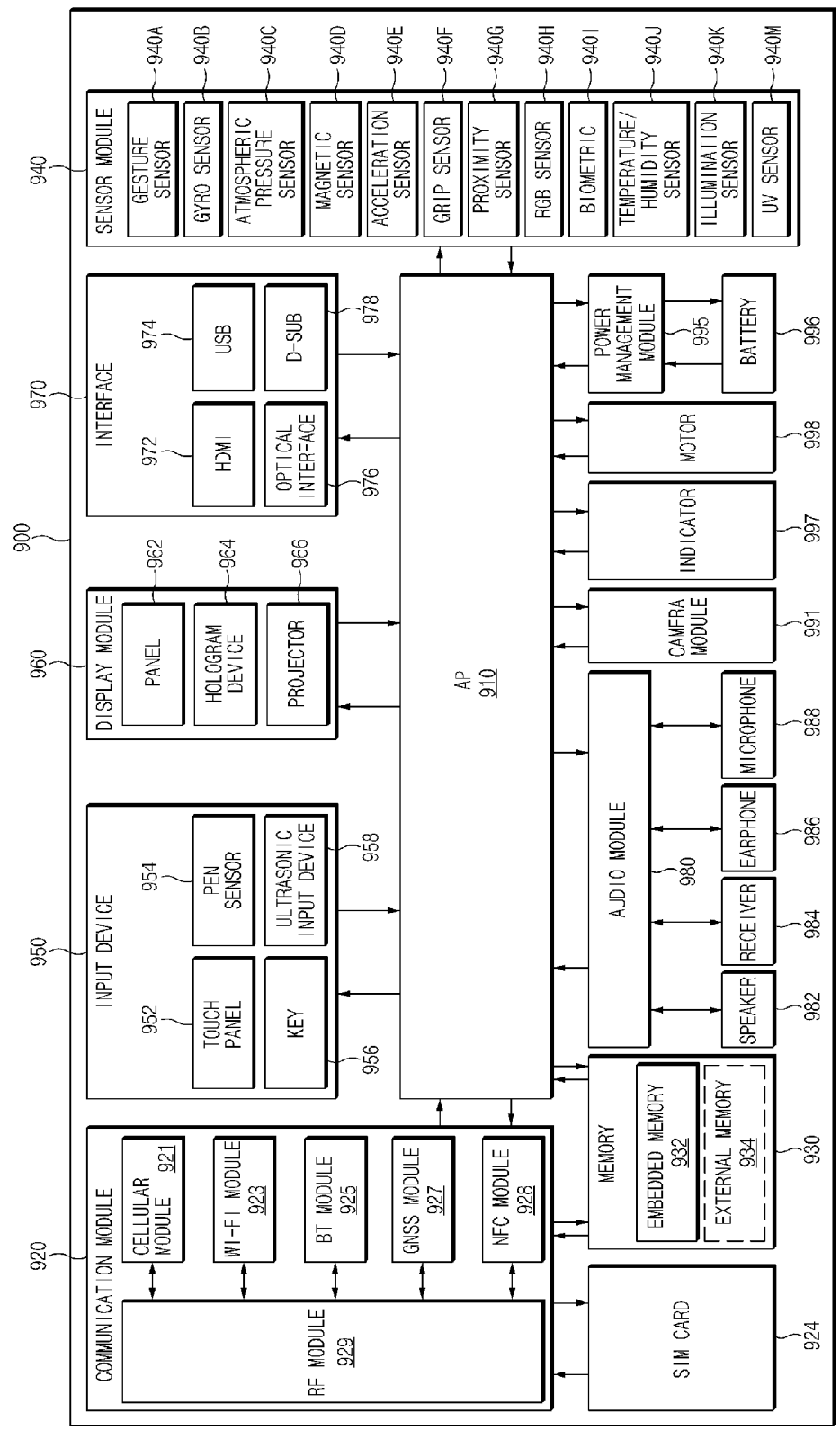
FIG. 9 is a block diagram illustrating a configuration of an electronic device according to various embodiments of the present disclosure.

FIG. 9 is a block diagram illustrating a configuration of an electronic device according to various embodiments of the present disclosure.

Referring now to FIG. 9, an electronic device 900 may include, for example, all or a part of an electronic device 100 shown in FIG. 1. The electronic device 900 may include one or more application processors (APs) 910, a communication module 920, a subscriber identification module (SIM) 924, a memory 930, a sensor module 940, an input device 950, a display 960, an interface 970, an audio module 980, a camera module 991, a power management module 995, a battery 996, an indicator 997, and a motor 998.

The AP 910 may drive, for example, an operating system (OS) or an application program to control a plurality of hardware or software components connected thereto and may process and compute a variety of data. The AP 910 may be implemented with, for example, a system on chip (SoC). According to an embodiment of the present disclosure, the AP 910 may further include a graphic processing unit (GPU) (not shown) and/or an image signal processor (not shown). The AP 910 may include at least some (e.g., a cellular module 921) of the components shown in FIG. 9. The AP 910 may load instructions or data received from at least one of other components (e.g., a non-volatile memory) to a volatile memory to process the data and may store various data in a non-volatile memory.

The communication module 920 may have the same or similar configuration as or to that of a communication interface 160 of FIG. 1. The communication module 920 may include, for example, the cellular module 921, a wireless-fidelity (Wi-Fi) module 923, a Bluetooth (BT) module 925, a global navigation satellite system (GNSS) module 927, a near field communication (NFC) module 928, and a radio frequency (RF) module 929.

The cellular module 921 may provide, for example, a voice call service, a video call service, a text message service, or an Internet service, and the like through a communication network. According to an embodiment of the present disclosure, the cellular module 921 may identify and authenticate the electronic device 900 in a communication network using a SIM (e.g., the SIM 924). According to an embodiment of the present disclosure, the cellular module 921 may perform at least a part of the functions which may be provided by the AP 910. According to an embodiment of the present disclosure, the cellular module 921 may include a communication processor (CP).

The Wi-Fi module 923, the BT module 925, the GNSS module 927, or the NFC module 928 may include, for example, a processor for processing data transmitted and received through the corresponding module. According to various embodiments of the present disclosure, at least a part (e.g., two or more) of the cellular module 921, the Wi-Fi module 923, the BT module 925, the GNSS module 927, or the NFC module 928 may be included in one integrated chip (IC) or one IC package.

The RF module 929 may transmit and receive, for example, a communication signal (e.g., an RF signal). Though not shown, the RF module 929 may include, for example, a transceiver, a power amplifier module (PAM), a frequency filter, or a low noise amplifier (LNA), or an antenna, and the like. According to another embodiment of the present disclosure, at least one of the cellular module 921, the Wi-Fi module 923, the BT module 925, the GNSS module 927, or the NFC module 928 may transmit and receive an RF signal through a separate RF module.

The SIM 924 may include, for example, a card which includes a SIM and/or an embedded SIM. The SIM 924 may include unique identification information (e.g., an integrated circuit card identifier (ICCID)) or subscriber information (e.g., an international mobile subscriber identity (IMSI)).

The memory 930 (e.g., a memory 130 of FIG. 1) may include, for example, an embedded memory 932 or an external memory 934. The embedded memory 932 may include at least one of, for example, a volatile memory (e.g., a dynamic random access memory (DRAM), a static RAM (SRAM), a synchronous dynamic RAM (SDRAM), and the like), or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory, and the like), a hard drive, or a solid state drive (SSD)).

The external memory 934 may further include a flash drive, for example, a compact flash (CF), a secure digital (SD), a micro-SD, a mini-SD, an extreme digital (xD), or a memory stick, and the like. The external memory 934 may functionally and/or physically connect with the electronic device 900 through various interfaces.

The sensor module 940 may measure, for example, a physical quantity or may detect an operation state of the electronic device 900, and may convert the measured or detected information to an electric signal. The sensor module 940 may include at least one of, for example, a gesture sensor 940A, a gyro sensor 940B, an atmospheric pressure sensor 940C, a magnetic sensor 940D, an acceleration sensor 940E, a grip sensor 940F, a proximity sensor 940G, a color sensor 940H (e.g., red, green, blue (RGB) sensor), a biosensor 940I, a temperature/humidity sensor 940J, an illumination sensor 940K, or an ultraviolet (UV) sensor 940M. Additionally or alternatively, the sensor module 940 may further include, for example, an e-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), and/or a fingerprint sensor (not shown), and the like. The sensor module 940 may further include a control circuit for controlling at least one or more sensors included therein. According to various embodiments of the present disclosure, the electronic device 900 may further include a processor configured to control the sensor module 940, as a part of the AP 910 or to be independent of the AP 910. While the AP 910 is in a sleep state, the electronic device 910 may control the sensor module 940. For example, the sensor module 940 may provide sensor information corresponding to a specific gesture operation and sensor information corresponding to specific biometric information. The sensor information may be used as input information and remote authentication information or local authentication information.

The input device 950 may include, for example, a touch panel 952, a (digital) pen sensor 954, a key 956, or an ultrasonic input unit 958. The touch panel 952 may recognize a touch input using at least one of, for example, a capacitive detecting method, a resistive detecting method, an infrared detecting method, or an ultrasonic detecting method. Also, the touch panel 952 may further include a control circuit. The touch panel 952 may further include a tactile layer and may provide a tactile reaction to a user.

The (digital) pen sensor 954 may be, for example a part of a touch panel or may include a separate sheet for recognition. The key 956 may include, for example, a physical button, an optical key, or a keypad. The ultrasonic input unit 958 may allow the electronic device 900 to detect a sound wave using a microphone (e.g., a microphone 988) and to verify data through an input tool generating an ultrasonic signal.

The display module 960 (e.g., a display 150 of FIG. 1) may include a panel 962, a hologram device 964, or a projector 966. The panel 962 may include the same or similar configuration as or to that of the display 150. The panel 962 may be implemented to be, for example, flexible, transparent, or wearable. The panel 962 and the touch panel 952 may be integrated into one module. The hologram device 964 may show a stereoscopic image in a space using interference of light. The projector 966 may project light onto a screen to display an image. The screen may be positioned, for example, inside or outside the electronic device 900. According to an embodiment of the present disclosure, the display 960 may further include a control circuit for controlling the panel 962, the hologram device 964, or the projector 966.

The interface 970 may include, for example, a high-definition multimedia interface (HDMI) 972, a universal serial bus (USB) 974, an optical interface 976, or a D-sub-miniature 978. The interface 970 may be included in, for example, a communication interface 160 shown in FIG. 1. Additionally or alternatively, the interface 970 may include, for example, a mobile high definition link (MHL) interface, an SD card/multimedia card (MMC) interface, or an infrared data association (IrDA) standard interface.

With continued reference to FIG. 9, the audio module 980 may convert between a sound and an electric signal. At least a part of components of the audio module 980 may be included in, for example, an input and output interface 140 shown in FIG. 1. The audio module 980 may process sound information input or output through, for example, a speaker 982, a receiver 984, an earphone 986, or the microphone 988, and the like. The microphone 988 included in the audio module 980 may collect audio data which may be used as input information and remote authentication information or local authentication information.

The camera module 991 may be a device which captures a still picture and a moving picture. According to an embodiment of the present disclosure, the camera module 991 may include one or more image sensors (not shown) (e.g., a front sensor or a rear sensor), a lens (not shown), an image signal processor (ISP) (not shown), or a flash (not shown) (e.g., an LED or a xenon lamp). The camera module 991 may collect fingerprint information, iris information, face information, and the like which may be used as input information and remote authentication or local authentication information.

The power management module 995 may manage, for example, power of the electronic device 900. According to an embodiment of the present disclosure, though not shown, the power management module 995 may include a power management integrated circuit (PMIC), a charger IC or a battery or fuel gauge. The PMIC may have a wired charging method and/or a wireless charging method. The wireless charging method may include, for example, a magnetic resonance method, a magnetic induction method, or an electromagnetic method, and the like. An additional circuit for wireless charging, for example, a coil loop, a resonance circuit, or a rectifier, and the like may be further provided. The battery gauge may measure, for example, the remaining capacity of the battery 996 and voltage, current, or temperature thereof while the battery 996 is charged. The battery 996 may include, for example, a rechargeable battery or a solar battery.

The indicator 997 may display a specific state of the electronic device 900 or a part (e.g., the AP 910) thereof, for example, a booting state, a message state, or a charging state, and the like. According to various embodiments of the present disclosure, the indicator 997 may output an indicator corresponding to a local authentication processing state or an indicator corresponding to a remote authentication processing state.

The motor 998 may convert an electric signal into mechanical vibration and may generate vibration or a haptic effect, and the like. Though not shown, the electronic device 900 may include a processing unit (e.g., a GPU) for supporting a mobile TV. The processing unit for supporting the mobile TV may process media data according to standards, for example, a digital multimedia broadcasting (DMB) standard, a digital video broadcasting (DVB) standard, or a media flow standard, and the like.

Figure 10:
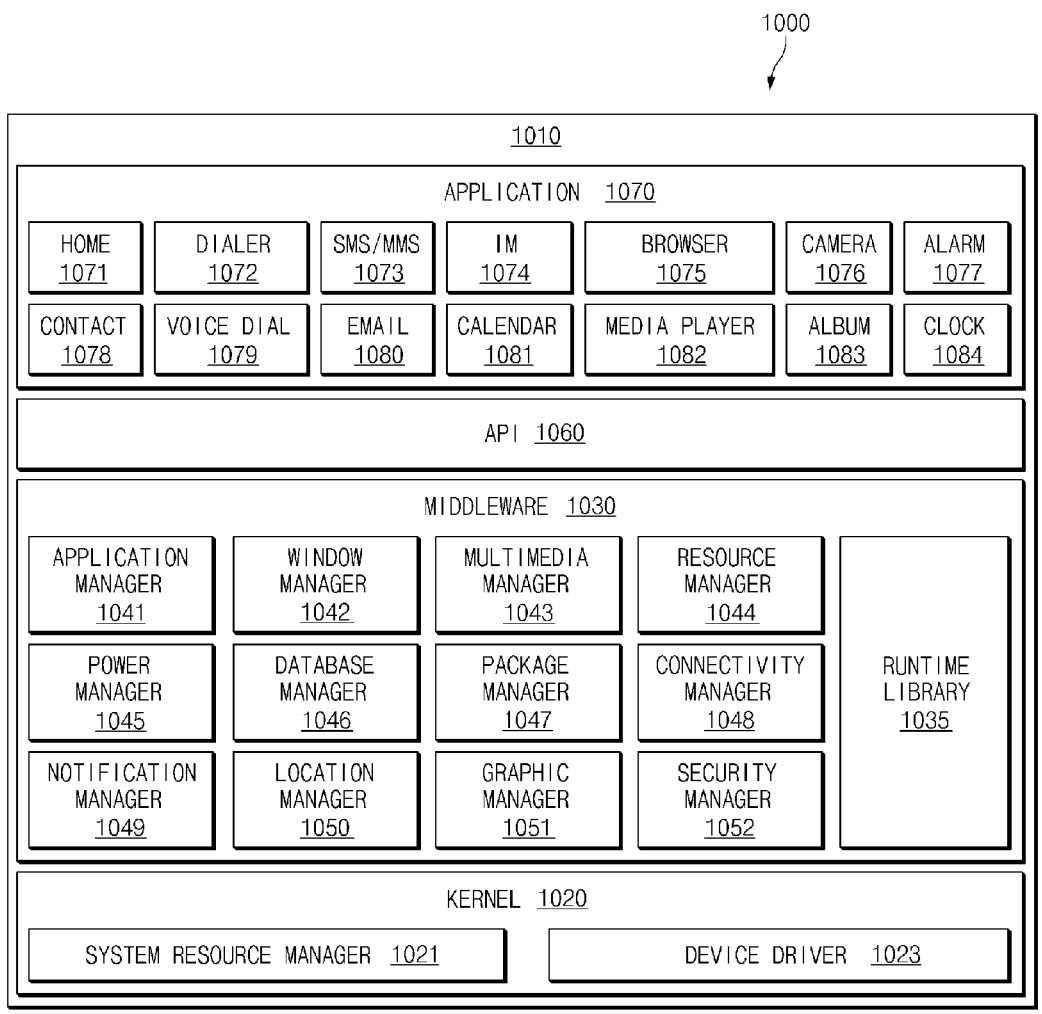
FIG. 10 is a block diagram illustrating a configuration of a program module according to various embodiments of the present disclosure.

FIG. 10 is a block diagram illustrating a configuration of a program module according to various embodiments of the present disclosure.

Referring now to FIG. 10, according to an embodiment of the present disclosure, a program module 1010 (e.g., a program 200 of FIG. 1) may include an operating system (OS) for controlling resources associated with an electronic device (e.g., an electronic device 100 of FIG. 1) and/or various applications (e.g., an application 204 of FIG. 1) which are executed on the OS. The OS may be, for example, Android, iOS, Windows, Symbian, Tizen, or Bada, and the like.

The program module 1010 may include a kernel 1020, a middleware 1030, an application programming interface (API) 1060, and/or an application 170. At least a part of the program module 1010 may be preloaded on the electronic device, or may be downloaded from an external electronic device.

The kernel 1020 (e.g., a kernel 201 of FIG. 1) may include, for example, a system resource manager 1021 and/or a device driver 1023. The system resource manager 1021 may control, assign, or collect, and the like system resources. According to an embodiment of the present disclosure, the system resource manager 1021 may include a process management unit, a memory management unit, or a file system management unit, and the like. The device driver 1023 may include, for example, a display driver, a camera driver, a Bluetooth (BT) driver, a shared memory driver, a universal serial bus (USB) driver, a keypad driver, a wireless-fidelity (Wi-Fi) driver, an audio driver, or an inter-process communication (IPC) driver.

The middleware 1030 (e.g., a middleware 202 of FIG. 1) may provide, for example, functions the application 1070 needs in common, and may provide various functions to the application 1070 through the API 1060 such that the application 1070 efficiently uses limited system resources in the electronic device. According to an embodiment of the present disclosure, the middleware 1030 (e.g., the middleware 202) may include at least one of a runtime library 1035, an application manager 1041, a window manager 1042, a multimedia manager 1043, a resource manager 1044, a power manager 1045, a database manager 1046, a package manager 1047, a connectivity manager 1048, a notification manager 1049, a location manager 1050, a graphic manager 1051, or a security manager 1052.

The runtime library 1035 may include, for example, a library module used by a compiler to add a new function through a programming language while the application 1070 is executed. The runtime library 1035 may perform a function about input and output management, memory management, or an arithmetic function.

The application manager 1041 may manage, for example, a life cycle of at least one of the application 1070. The window manager 1042 may manage graphic user interface (GUI) resources used on a screen of the electronic device. The multimedia manager 1043 may ascertain a format utilized for reproducing various media files and may encode or decode a media file using a codec corresponding to the corresponding format. The resource manager 1044 may manage source codes of at least one of the application 1070, and may manage resources of a memory or a storage space, and the like.

The power manager 1045 may act together with, for example, a basic input/output system (BIOS) and the like, may manage a battery or a power source, and may provide power information utilized for an operation of the electronic device. The database manager 1046 may generate, search, or change a database to be used in at least one of the application 1070. The package manager 1047 may manage installation or update of an application distributed by a type of a package file.

With continued reference to FIG. 10, the connectivity manager 1048 may manage, for example, wireless connection such as Wi-Fi connection or BT connection, and the like. The notification manager 1049 may display or notify events, such as an arrival message, an appointment, and proximity notification, by a method which is not disturbed to the user. The location manager 1050 may manage location information of the electronic device. The graphic manager 1051 may manage a graphic effect to be provided to the user or a user interface (UI) related to the graphic effect. The security manager 1052 may provide all security functions utilized for system security or user authentication, and the like. According to an embodiment of the present disclosure, when the electronic device (e.g., the electronic device 100) has a phone function, the middleware 1030 may further include a telephony manager (not shown) for managing a voice or video communication function of the electronic device.

The middleware 1030 may include a middleware module which configures combinations of various functions of the above-described components. The middleware 1030 may provide a module which specializes according to kinds of OSs to provide a differentiated function. Also, the middleware 1030 may dynamically delete some of old components or may add new components.

The API 1060 (e.g., an API 203 of FIG. 1) may be, for example, a set of API programming functions, and may be provided with different components according to OSs. For example, in case of Android or iOS, one API set may be provided according to platforms. In case of Tizen, two or more API sets may be provided according to platforms.

The application 1070 (e.g., an application program 204 of FIG. 1) may include one or more of, for example, a home application 1071, a dialer application 1072, a short message service/multimedia message service (SMS/MMS) application 1073, an instant message (IM) application 1074, a browser application 1075, a camera application 1076, an alarm application 1077, a contact application 1078, a voice dial application 1079, an e-mail application 1080, a calendar application 1081, a media player application 1082, an album application 1083, a clock application 1084, a health care application (e.g., an application for measuring quantity of exercise or blood sugar, and the like), or an environment information application (e.g., an application for providing atmospheric pressure information, humidity information, or temperature information, and the like), and the like.

According to an embodiment of the present disclosure, the application 1070 may include an application (hereinafter, for better understanding and ease of description, referred to as "information exchange application") for exchanging information between the electronic device (e.g., the electronic device 100) and an external electronic device. The information exchange application may include, for example, a notification relay application for transmitting specific information to the external electronic device or a device management application for managing the external electronic device.

For example, the notification relay application may include a function of transmitting notification information, which is generated by other applications (e.g., the SMS/MMS application, the e-mail application, the health care application, or the environment information application, and the like) of the electronic device, to the external electronic device. Also, the notification relay application may receive, for example, notification information from the external electronic device, and may provide the received notification information to the user of the electronic device.

The device management application may manage (e.g., install, delete, or update), for example, at least one (e.g., a function of turning on/off the external electronic device itself (or partial components) or a function of adjusting brightness (or resolution) of a display) of functions of the external electronic device which communicates with the electronic device, an application which operates in the external electronic device, or a service (e.g., a call service or a message service) provided from the external electronic device.

According to an embodiment of the present disclosure, the application 1070 may include an application (e.g., the health card application of a mobile medical device) which is preset according to attributes of the electronic device. According to an embodiment of the present disclosure, the application 1070 may include an application received from the external electronic device. According to an embodiment of the present disclosure, the application 1070 may include a preloaded application or a third party application which may be downloaded from a server. Names of the components of the program module 1010 according to various embodiments of the present disclosure may differ according to kinds of OSs.

The apparatuses and methods of the disclosure can be implemented in hardware, and in part as firmware or via the execution of software or computer code in conjunction with hardware that is stored on a non-transitory machine readable medium such as a CD ROM, a RAM, a floppy disk, a hard disk, or a magneto-optical disk, or computer code downloaded over a network originally stored on a remote recording medium or a non-transitory machine readable medium and stored on a local non-transitory recording medium for execution by hardware such as a processor, so that the methods described herein are loaded into hardware such as a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc., that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor", "microprocessor" "controller", or "control unit" constitute hardware in the claimed disclosure that contain circuitry that is configured for operation. Under the broadest reasonable interpretation, the appended claims constitute statutory subject matter in compliance with 35 U.S.C. § 101 and none of the elements are software per se. No claim element herein is to be construed under the provisions of 35 U.S.C. 112, sixth paragraph, unless the element is expressly recited using the phrase "means for".

The definition of the terms "unit" or "module" as referred to herein are to be understood as constituting hardware circuitry such as a CCD, CMOS, SoC, AISC, FPGA, a processor or microprocessor (a controller) configured for a certain desired functionality, or a communication module containing hardware such as transmitter, receiver or transceiver, or a non-transitory medium comprising machine executable code that is loaded into and executed by hardware for operation, in accordance with statutory subject matter under 35 U.S.C. §101 and do not constitute software per se. For example, the image processor in the present disclosure, and any references to an input unit and/or an output unit both comprise hardware circuitry configured for operation.

According to various embodiments of the present disclosure, at least a part of the program module 1010 may be implemented with software in conjunction with, firmware, hardware, or at least two or more combinations thereof. At least a part of the program module 1010 may be implemented (e.g., executed) by, for example, one or more processors (e.g., a processor 120 of FIG. 1 comprised of integrated circuits). At least a part of the program module 1010 may include, for example, a module, a program, a routine, sets of instructions, or a process, and the like for performing one or more functions.

The terminology "module" used herein may mean, for example, a unit including one of hardware, software, and firmware or two or more combinations thereof. The terminology "module" may be interchangeably used with, for example, terminologies "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of an application-specific integrated circuit (ASIC) chip, field-programmable gate arrays (FPGAs), or a programmable-logic device, which is well known or will be developed in the future, for performing certain operations.

According to various embodiments of the present disclosure, at least a part of a device (e.g., modules or the functions) or a method (e.g., operations) may be implemented with, for example, instructions stored in a computer-readable storage media which has a program module. When the instructions are executed by a processor (e.g., a processor 120 of FIG. 1), one or more processors may perform functions corresponding to the instructions. The computer-readable storage media may be, for example, the non-transitory memory 130.

Each of the above-mentioned elements of the electronic device according to various embodiments of the present disclosure may be configured with one or more components, and names of the corresponding elements may be changed according to the type of the electronic device. The electronic device according to various embodiments of the present disclosure may include at least one of the above-mentioned elements, some elements may be omitted from the electronic device, or other additional elements may be further included in the electronic device. Also, some of the elements of the electronic device according to various embodiments of the present disclosure may be combined with each other to form one entity, thereby making it possible to perform the functions of the corresponding elements in the same manner as before the combination.

The computer-readable storage media may include a hard disc, a floppy disk, magnetic media (e.g., a magnetic tape), optical media (e.g., a compact disc read only memory (CD-ROM) and a digital versatile disc (DVD)), magneto-optical media (e.g., a floptical disk), a hardware device (e.g., a ROM, a random access memory (RAM), or a flash memory, and the like), and the like. Also, the program instructions may include not only mechanical codes compiled by a compiler but also high-level language codes which may be executed by a computer using an interpreter and the like. The above-mentioned hardware device may be configured to operate as one or more software modules to perform operations according to various embodiments of the present disclosure, and vice versa.

According to various embodiments of the present disclosure, the computer-readable storage media may store instructions which may be executed by at least one processor. The instructions may be set such that the processor transmits credential information input in the electronic device to an external server through a communication module of the electronic device, receives an authentication request of the credential information through a user interface of the electronic device, determines whether the electronic device communicates with the external server, processes the authentication request according to at least a part of the determined result and the credential information stored in the electronic device, or determines whether to transmit the authentication request through the communication module according to the credential information stored in the external server.

According to various embodiments of the present disclosure, the computer-readable storage media may store instructions which may be executed by at least one processor. The instructions may be set such that the processor receives a function access request utilized for authentication processing, receives input information associated with the authentication processing, and performs at least one of local authentication processing performed according to local authentication information stored in an electronic device or remote authentication processing performed according to remote authentication information stored in an external server device according to at least one of whether the remote authentication information is changed or whether a network is available, using the received input information.

According to various embodiments of the present disclosure, a computing device, including a memory which stores at least one instruction, may include at least one processor for performing a specific operation according to the instruction. The processor may include a local authentication processing processor which performs local authentication processing in an electronic device according to local authentication information stored in the memory, a remote authentication processing processor which performs remote authentication processing according to remote authentication information stored in an external server device, and a driving control processor which controls driving of at least one of the local authentication processing processor or the remote authentication processing processor according to whether the remote authentication information is changed and whether the electronic device connects with the external server device.

Modules or program modules according to various embodiments of the present disclosure may include at least one or more of the above-mentioned components, some of the above-mentioned components may be omitted, or other additional components may be further included. Operations executed by modules, program modules, or other components may be executed by a successive method, a parallel method, a repeated method, or a heuristic method. Also, some operations may be executed in a different order or may be omitted, and other operations may be added.

According to various embodiments of the present disclosure, the electronic device may adaptively process a local authentication procedure (or processing) performed according to credential information stored in the electronic device and a remote authentication procedure (or processing) performed according to credential information stored in an external server according to a situation of the electronic device.

The embodiments of the present disclosure described and shown in the drawings are provided as examples to describe technical content and help understanding but do not limit the scope of the present disclosure. Accordingly, it should be interpreted that besides the embodiments listed herein, all modifications or modified forms derived based on the technical ideas of the present disclosure are included in the scope of the present disclosure as defined in the claims, and their equivalents.

What is claimed is:

1. A method for operating an electronic device, the method comprising:
    transmitting to an external server, by at least one processor of the electronic device, credential information input in the electronic device through a communication module;
    receiving an authentication request of the credential information by at least one processor of the electronic device, through a user interface;
    verifying, by the at least one processor of the electronic device, change enable/disable information stored in the electronic device indicating whether remote authentication information has changed;
    in response to the receiving the authentication request,
        if change enable/disable information indicates that the remote authentication information has not changed, performing a local authentication procedure by the at least one processor of the electronic device based on the credential information stored in the electronic device and requesting a remote authentication procedure based on the credential information stored in the external server through the communication module, and
        if the change enable/disable information indicates that remote authentication information has changed, requesting the remote authentication procedure through the communication module.

2. The method of claim 1, further comprising:
    outputting a specific guide information, if the change enable/disable information indicates that remote authentication information has not changed and if the local authentication procedure and the remote authentication procedure fail.

3. The method of claim 1, further comprising:
    granting a requested function access, if the local authentication procedure fails and the remote authentication procedure succeeds.

4. The method of claim 1, further comprising:
    granting a requested function access and requesting the remote authentication procedure based on the credential information stored in the external server, if the local authentication procedure succeeds.

5. The method of claim 4, further comprising:
    setting a state value of the change enable/disable information to a value indicating that remote authentication information has changed, if the remote authentication procedure fails.

6. The method of claim 1, further comprising:
    granting a function access and setting the change enable/disable information to a value indicating that remote authentication information has not changed, if the change enable/disable information indicates that remote authentication information has changed and if the remote authentication procedure succeeds.

7. The method of claim 1, further comprising:
    limiting a function access and controlling an output of guide information associated with an information change, if the change enable/disable information indicates that remote authentication information has changed and if the remote authentication procedure fails.

8. An electronic device comprising:
    a communication module;
    a user interface;
    a memory; and
    at least one processor configured to be electrically connected with the communication module, the user interface, and the memory,
    wherein the memory stores instructions, when executed by the at least one processor, causes the at least one processor to:
    transmit credential information of the electronic device to an external server through the communication module,
    receive an authentication request of the credential information through the user interface,
    verify change enable/disable information stored in the electronic device indicating whether remote authentication information has changed;
    in response to the receiving the authentication request,
        if change enable/disable information indicates that remote authentication information has not changed, perform a local authentication procedure based on the credential information stored in the electronic device and request a remote authentication procedure based on the credential information stored in the external server through the communication module, and
        if the change enable/disable information indicates that remote authentication information has changed, request the remote authentication procedure through the communication module.

9. The electronic device of claim 8, wherein the instructions further cause the processor to output a specific guide information if the change enable/disable information indicates that remote authentication information has not changed and if the local authentication procedure and the remote authentication procedure fail.

10. The electronic device of claim 8, wherein the instructions further cause the processor to grant a requested function access if the local authentication procedure fails and the remote authentication procedure succeeds.

11. The electronic device of claim 8, wherein the instructions further cause the processor to grant a requested function access and requests the remote authentication procedure based on the credential information stored in the external server if the local authentication procedure succeeds.

12. The electronic device of claim 11, wherein the instructions further cause the processor to set a state value of the change enable/disable information to a value indicating that remote authentication information has changed, if the remote authentication procedure fails.

13. The electronic device of claim 8, wherein the instructions further cause the processor to grant a function access and sets the change enable/disable information to a value that remote authentication information has not changed, if the remote authentication procedure succeeds.

14. The electronic device of claim 8, wherein the instructions further cause the processor to limit a function access and outputs guide information associated with an information change, if the change enable/disable information indicates that remote authentication information has changed and if the remote authentication procedure fails.

* * * * *